(12) United States Patent
Fukawatase

(10) Patent No.: US 9,193,326 B2
(45) Date of Patent: Nov. 24, 2015

(54) OCCUPANT PROTECTION DEVICE

(71) Applicant: Osamu Fukawatase, Miyoshi (JP)

(72) Inventor: Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/960,293

(22) Filed: Aug. 6, 2013

(65) Prior Publication Data

US 2014/0042733 A1    Feb. 13, 2014

(30) Foreign Application Priority Data

Aug. 10, 2012 (JP) ................. 2012-177990

(51) Int. Cl.
| B60R 21/207 | (2006.01) |
| B60R 21/231 | (2011.01) |
| B60R 21/0136 | (2006.01) |
| B60R 21/01 | (2006.01) |
| B60R 21/00 | (2006.01) |

(52) U.S. Cl.
CPC ....... B60R 21/23138 (2013.01); B60R 21/0136 (2013.01); B60R 21/207 (2013.01); B60R 21/231 (2013.01); B60R 2021/0006 (2013.01); B60R 2021/01034 (2013.01); B60R 2021/01245 (2013.01); B60R 2021/23107 (2013.01); B60R 2021/23146 (2013.01); B60R 2021/23161 (2013.01)

(58) Field of Classification Search
CPC ...... B60R 21/06; B60R 21/08; B60R 21/207; B60R 21/23138; B60R 2021/06; B60R 2021/207; B60R 2021/23107; B60R 2021/23138; B60R 2021/23146; B60R 2021/23161

USPC ........ 280/730.1, 730.2, 736, 742, 743.2, 749
See application file for complete search history.

(56) References Cited

U.S. PATENT DOCUMENTS

| 3,981,520 | A | * | 9/1976 | Pulling ..................... 280/730.2 |
| 5,072,966 | A | * | 12/1991 | Nishitake et al. ......... 280/730.2 |
| 5,172,790 | A | * | 12/1992 | Ishikawa et al. .............. 180/268 |
| 5,499,840 | A | * | 3/1996 | Nakano ....................... 280/730.1 |
| 5,556,128 | A | * | 9/1996 | Sinnhuber et al. ......... 280/730.2 |
| 5,806,923 | A | * | 9/1998 | Tschaschke et al. ..... 297/216.13 |

(Continued)

FOREIGN PATENT DOCUMENTS

| JP | H03-108564 U | 11/1991 |
| JP | A-3-276843 | 12/1991 |

(Continued)

OTHER PUBLICATIONS

Machine translation of JP 08-001982.*

(Continued)

*Primary Examiner* — Ruth Ilan
*Assistant Examiner* — Barry Gooden, Jr.
(74) *Attorney, Agent, or Firm* — Oliff PLC

(57) ABSTRACT

A side-impact airbag system includes an inner airbag that is supplied with gas and inflates and deploys in an inner side in a vehicle width direction for a seating occupant on a driver's seat, and an ECU that instructs an inner inflator to supply gas to the inner airbag. The ECU activates the inner inflator of the driver's seat to supply gas to the inner airbag at a first timing in the event of the side impact collision on a passenger seat side and at second timing that is set to be later than the first timing in the event of the side impact collision on a driver's seat side.

16 Claims, 13 Drawing Sheets

(56) References Cited

U.S. PATENT DOCUMENTS

| | | | |
|---|---|---|---|
| 7,559,573 B2 * | 7/2009 | Fukawatase et al. | 280/730.2 |
| 7,717,459 B2 * | 5/2010 | Bostrom et al. | 280/730.1 |
| 8,267,424 B2 * | 9/2012 | Tomitaka et al. | 280/730.2 |
| 8,282,126 B2 * | 10/2012 | Wiik et al. | 280/730.2 |
| 8,353,529 B2 * | 1/2013 | Tomitaka et al. | 280/730.2 |
| 8,388,019 B2 * | 3/2013 | Wipasuramonton et al. | 280/730.2 |
| 8,414,018 B2 * | 4/2013 | Choi et al. | 280/730.1 |
| 8,448,981 B2 * | 5/2013 | Fukawatase | 280/730.2 |
| 2007/0096444 A1 * | 5/2007 | Bostrom et al. | 280/730.2 |
| 2008/0100045 A1 * | 5/2008 | Fukawatase et al. | 280/730.2 |
| 2008/0129024 A1 * | 6/2008 | Suzuki et al. | 280/734 |
| 2009/0200775 A1 * | 8/2009 | Sugimoto et al. | 280/730.2 |
| 2010/0078921 A1 * | 4/2010 | Ryan et al. | 280/730.2 |
| 2010/0295280 A1 * | 11/2010 | Tomitaka et al. | 280/730.1 |
| 2010/0314859 A1 * | 12/2010 | Tomitaka et al. | 280/730.2 |
| 2011/0006507 A1 * | 1/2011 | Fukawatase et al. | 280/733 |
| 2011/0049852 A1 * | 3/2011 | Kibat et al. | 280/743.2 |
| 2011/0074141 A1 * | 3/2011 | Wipasuramonton et al. | 280/736 |
| 2011/0278826 A1 * | 11/2011 | Fukawatase et al. | 280/730.2 |
| 2012/0123645 A1 * | 5/2012 | Kwon et al. | 701/46 |
| 2013/0197764 A1 * | 8/2013 | Thomas | 701/45 |
| 2014/0015233 A1 * | 1/2014 | Fukawatase | 280/730.1 |

FOREIGN PATENT DOCUMENTS

| | | |
|---|---|---|
| JP | H03-121156 U | 12/1991 |
| JP | A-4-212650 | 8/1992 |
| JP | A-7-267037 | 10/1995 |
| JP | H09-150662 A | 6/1997 |
| JP | H11-278198 A | 10/1999 |
| JP | 2001-158269 A | 6/2001 |

OTHER PUBLICATIONS

Aug. 5, 2014 Partial Translation of Office Action issued in Japanese Application No. 2012-177990.

* cited by examiner

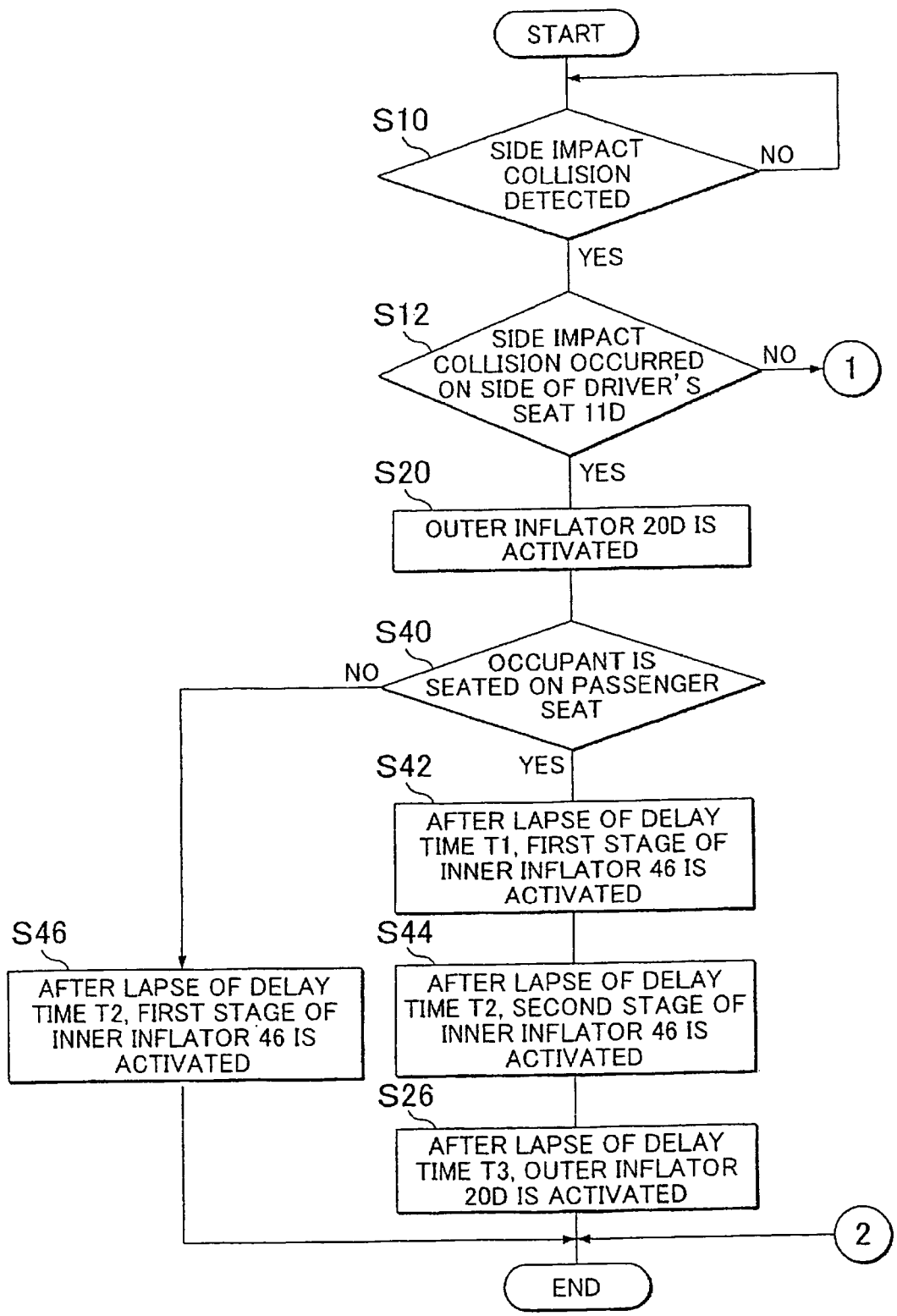

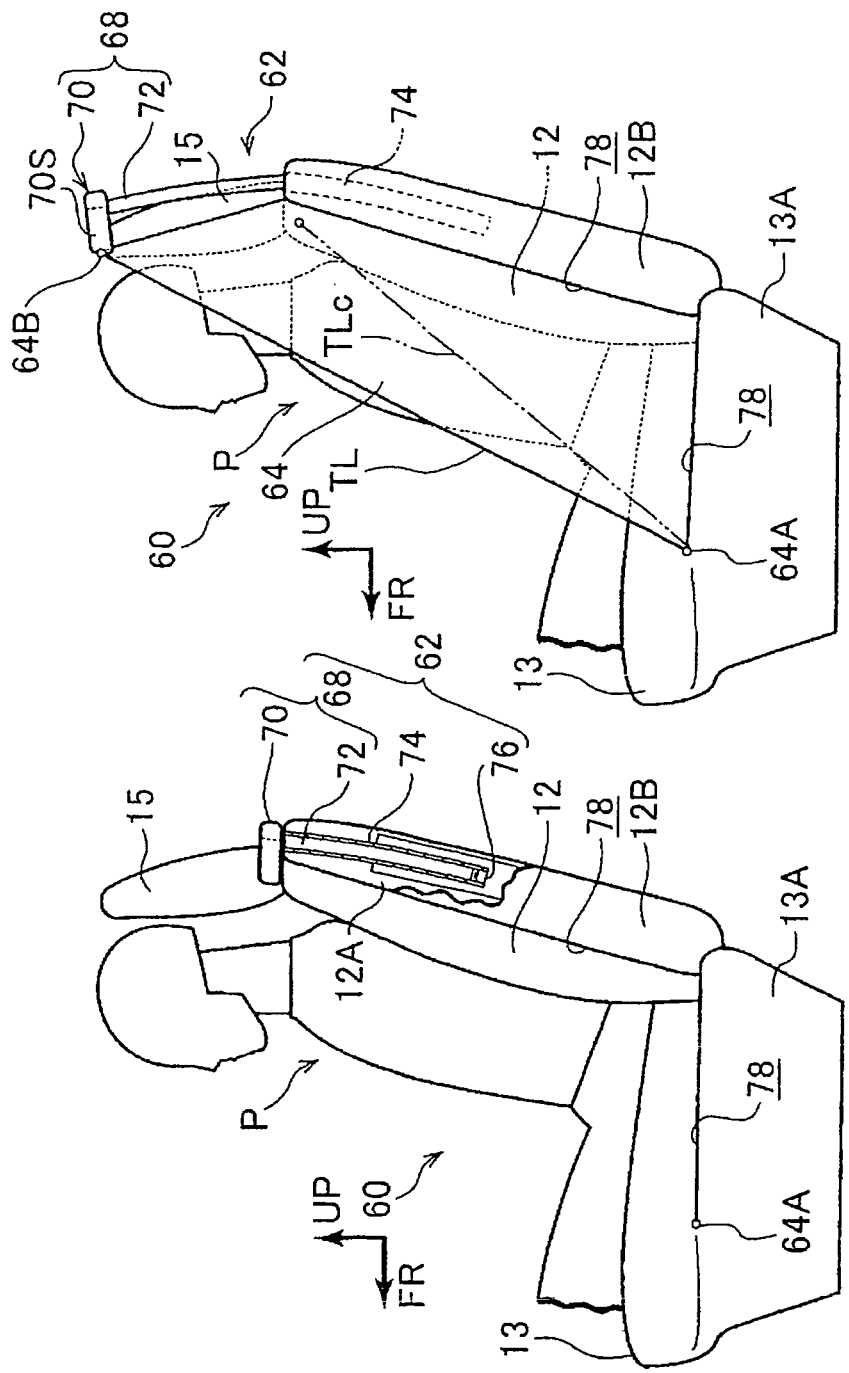

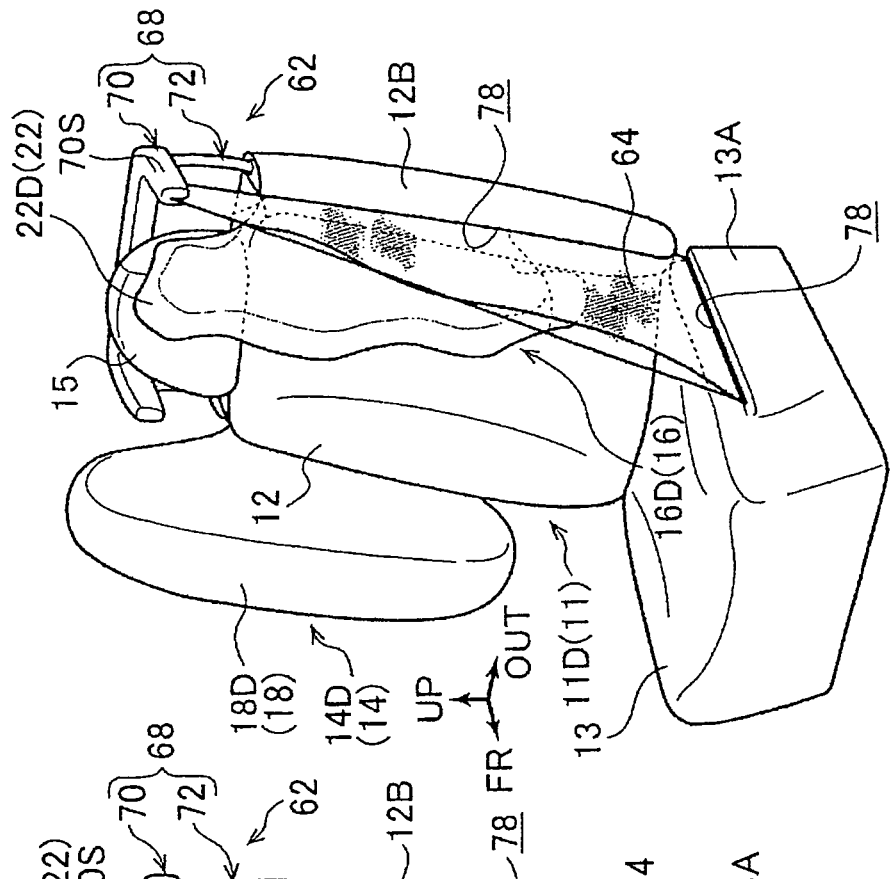
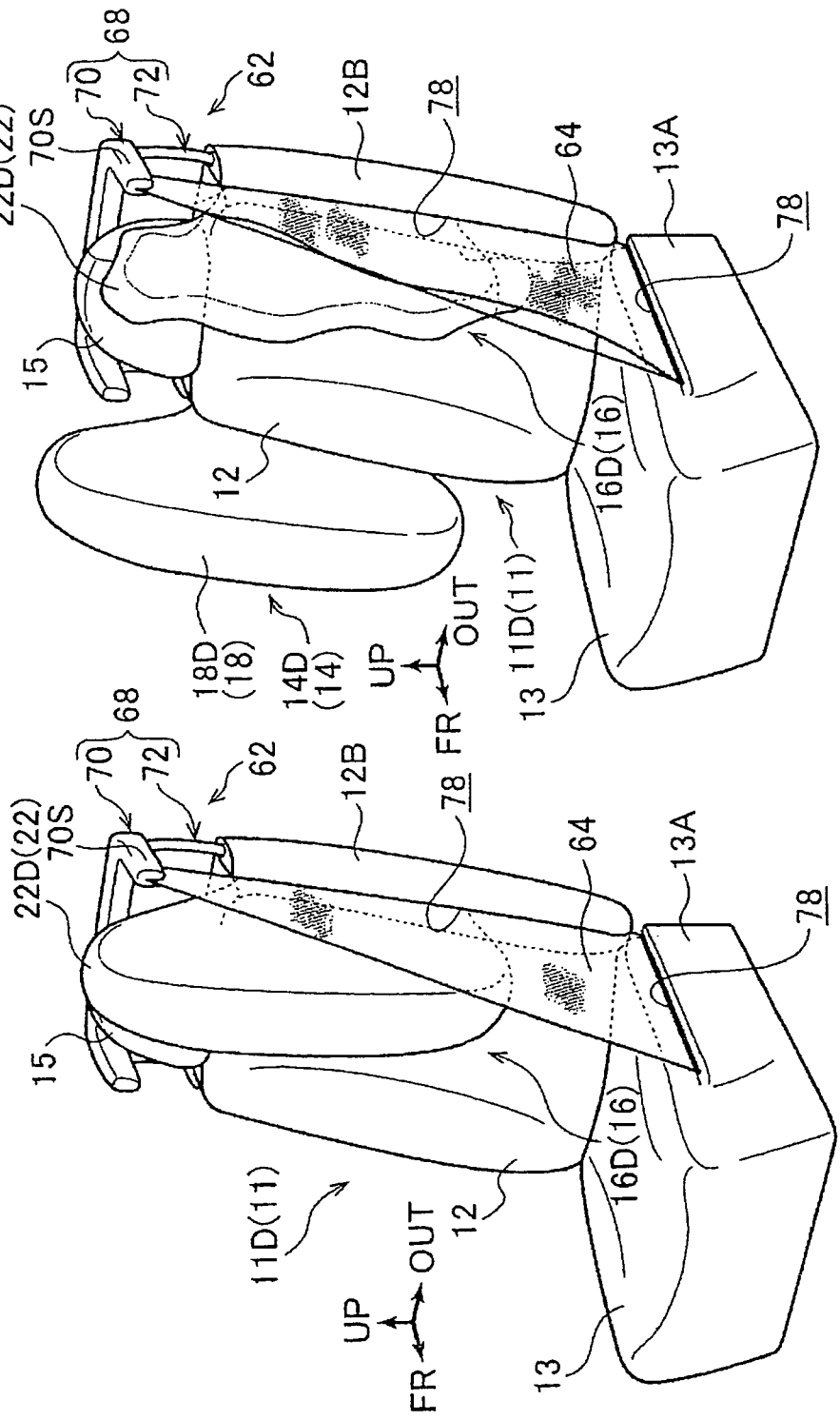

OCCUPANT PROTECTION DEVICE

INCORPORATION BY REFERENCE

The disclosure of Japanese Patent Application No. 2012-177990 filed on Aug. 10, 2012 including the specification, drawings and abstract is incorporated herein by reference in its entirety.

BACKGROUND OF THE INVENTION

1. Field of the Invention

The present invention relates to an occupant protection device.

2. Description of Related Art

A vehicle seat is well-known in which a side-impact airbag is installed in each of an inner and an outer protrusions that are provided in an upper section of a seat back (for example, see Japanese Patent Application Publication No. 7-267037 (JP 7-267037 A)). In the vehicle seat described above, in the event of the side impact collision, the side-impact airbag in the outer protrusion inflates first, and then the side-impact airbag (side airbag) in the inner protrusion inflates.

In the vehicle seat described above, the difference in the direction of the side impact collision is not taken into account.

SUMMARY OF THE INVENTION

An object of the present invention is to provide an occupant protection device that appropriately protects an occupant in accordance with the direction of the side impact collision.

The occupant protection device according to a first aspect of the present invention includes: an inner airbag that is supplied with gas and inflates and deploys in an inner side in a vehicle width direction for a seating occupant on a seat that is arranged to offset in a first direction of the vehicle width direction with respect to a central part of a vehicle in the vehicle width direction; and a gas supply device that supplies gas to the inner airbag at a first timing in the event of a side impact collision of the vehicle in a second direction of the vehicle width direction that is an opposite direction of the first direction and supplies gas to the inner airbag at a second timing that is set to be later than the first timing in the event of a side impact collision of the vehicle in the first direction of the vehicle width direction.

In the occupant protection device according to the aspect described above, when the side impact collision occurs on the vehicle in the second direction of the vehicle width direction in which the vehicle seats are arranged, the gas is supplied to the inner airbag at the first timing. Accordingly, the movement of the seating occupant on the seat toward the collision side (the side in a second direction of the vehicle width direction) is restrained by the inflated and deployed inner airbag. On the other hand, when the side impact collision occurs on the vehicle in the first direction of the vehicle width direction, the gas is supplied to the inner airbag at the second timing. Because the second timing is set to be later than the first timing, the movement of the seating occupant toward the opposite side of the collision (the side in the second direction of the vehicle width direction) due to swinging-back by the movement to the collision side (the side in the first direction of the vehicle width direction).

As described above, the occupant protection device according to the first aspect of the present invention can appropriately protect the occupants in accordance with the direction of the side impact collision.

The occupant protection device according to a second aspect of the present invention includes: an inter-seat airbag that is supplied with gas and inflates and deploys between a pair of seats that are arranged next to each other in a vehicle width direction; and a gas supply device in which a second timing at which gas is supplied to the inter-seat airbag during protection of a seating occupant on a seat on a collision side is set to be later than a first timing at which gas is supplied to the inter-seat airbag during protection of a seating occupant on a seat on an opposite side of the collision in the event of a side impact collision.

In the occupant protection device according to the aspect described above, in the event of the side impact collision of the vehicle, the gas is supplied to the inter-seat airbag, and the inter-seat airbag inflates and deploys. Accordingly, the movement of the occupant on the seat on the opposite side of the collision toward the collision side is restrained. In addition, the movement of the occupant on the seat on the collision side toward the opposite side of the collision due to the swinging-back after the movement toward the collision side is restrained. Incidentally, in the event of the side impact collision, the movement of the occupant on the seat on the opposite side of the collision toward the collision side is made prior to the movement of the occupant on the seat on the collision side toward the opposite side of the collision. In the occupant protection device herein, the second timing at which gas is supplied for protecting the occupant on the seat on the collision side is set to be later than the first timing at which gas is supplied for protecting the occupant on the seat on the opposite side of the collision. Therefore, the inter-seat airbag inflates and deploys at an appropriate timing in accordance with the behavior of the occupant due to the direction of the side impact collision. Accordingly, the airbag of which the inflation and deployment time is limited can appropriately protect the occupants against the side impact collision.

As described above, the occupant protection device according to the second aspect of the present invention can appropriately protect the occupants in accordance with the direction of the side impact collision.

As described above, the occupant protection device according to the present invention can appropriately protect the occupants in accordance with the direction of the side impact collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8A is a flowchart that shows a control flow in the side-impact airbag system according to the second embodiment;

FIG. 11A is a partly cutaway side view that shows the vehicle seat to which the side-impact airbag system according to the third embodiment is applied and a non-operating state of the tension cloth device;

FIG. 11B is a partly cutaway side view that shows the vehicle seat to which the side-impact airbag system according to the third embodiment is applied and an operating state of the tension cloth device;

FIG. 12A is a perspective view that illustrates an operation of the side-impact airbag system according to the third embodiment and shows a deployment state of the inner airbag; and FIG. 12B is a perspective view that illustrates an operation of the side-impact airbag system according to the third embodiment and shows a deployment state of the outer airbag.

DETAILED DESCRIPTION OF EMBODIMENTS

Figure 1:
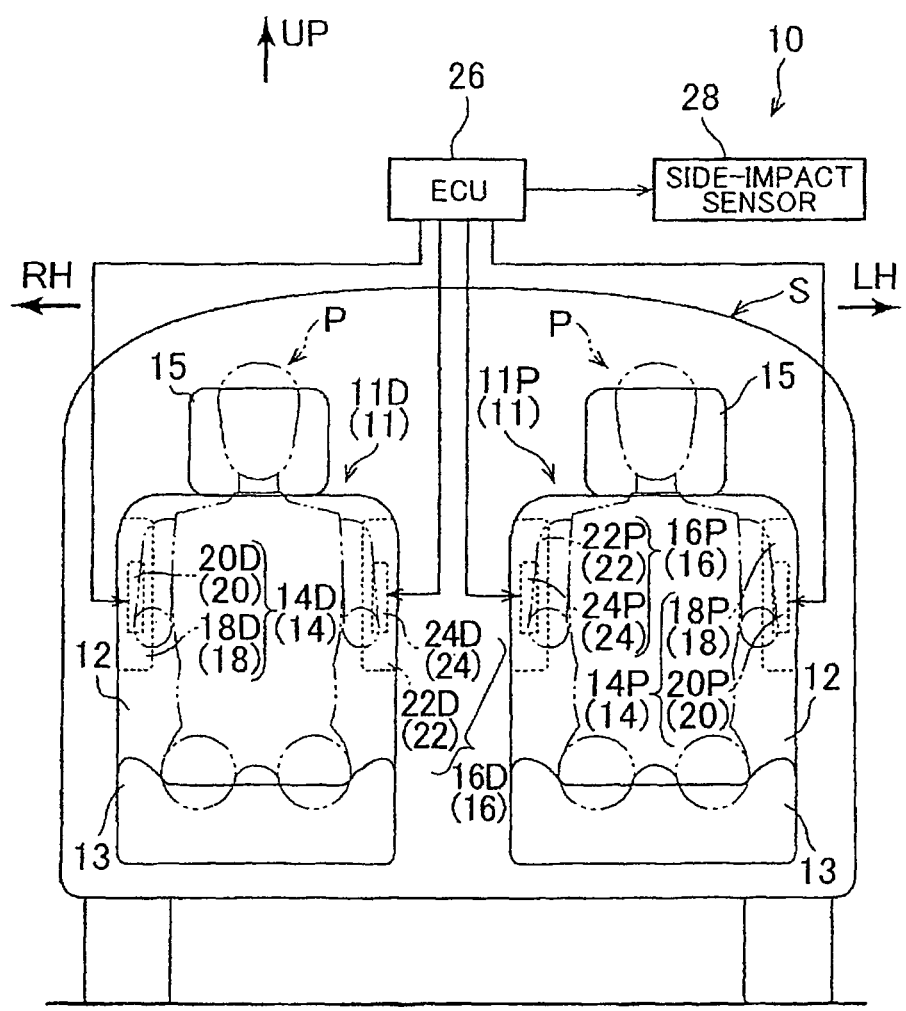
FIG. 1 is a front view that schematically shows an entire schematic structure of a side-impact airbag system according to a first embodiment of the present invention.

Embodiments of the present invention will be described with reference to the attached drawings. It should be noted that arrows FR, UP, RH, and LH appropriately indicated in the drawings respectively denote a front direction and an upward direction of the vehicle adopting a side-impact airbag system as an occupant protection device according to the embodiments, and a right-hand direction and a left-hand direction when the vehicle face the front direction. Hereinafter, simply front, rear, up, down, right, and left directions used in descriptions denote front and rear in the vehicle longitudinal direction, upward and downward directions in the vehicle vertical direction, and right-hand and left-hand directions when the occupants of the vehicle face the front direction, unless otherwise specified.

A side-impact airbag system 10 as the occupant protection device according to a first embodiment will be described with reference to FIGS. 1 through 6. FIG. 1 is a front view that schematically shows the inside of an automobile S to which the side-impact airbag system 10 is applied. As shown in FIG. 1, the automobile S includes a pair of vehicle seats 11 as a pair of right and left seats.

The vehicle seats 11 are constructed such that a lower end of a seat back 12 is connected to a rear end of a seat cushion 13. A headrest 15 is disposed on an upper end of the seat back 12. When the right or the left vehicle seat 11 is to be identified, the vehicle seat 11 is referred to as a driver's seat 11D or a passenger seat 11P. In this embodiment, as seen from the center to the front side of the vehicle, the vehicle seat 11 on the right-hand side is designated as the driver's seat 11D, and the vehicle seat 11 on the left-hand side is designated as the passenger seat 11P.

An outer airbag device 14 and an inner airbag device 16 are disposed in each of the seat backs 12 of the right and left vehicle seats 11. The outer airbag device 14 is disposed on an outer side (door side) of the vehicle seat 11 in a vehicle width direction. The inner airbag device 16 is disposed on an inner side of the vehicle seat 11 in the vehicle width direction.

The outer airbag device 14 includes an outer airbag 18 and an outer inflator 20 as its major components. Components (parts) such as the outer airbag 18 and the outer inflator 20 are modularized and housed in the outer side of the seat back 12 in the vehicle width direction. The outer airbag 18 is supplied with gas from the outer inflator 20 when the outer inflator 20 is activated and inflates and deploys from the seat back 12 toward the front (see FIGS. 4A, 5B, 6A, and 6D). The inflated and deployed outer airbag 18 restrains the movement of a seating occupant P to an outside in the vehicle width direction.

The inner airbag device 16 includes an inner airbag 22 as an airbag between seats and an inner inflator 24 as a gas supply unit as its major components. Components (parts) such as the inner airbag 22 and the inner inflator 24 are modularized and housed in the inner side of the seat back 12 in the vehicle width direction. The inner airbag 22 is supplied with gas from the inner inflator 24 when the inner inflator 24 is activated and inflates and deploys from the seat back 12 toward the front (see FIGS. 4B, 5A, 6B, and 6C). The inflated and deployed inner airbag 22 restrains the movement of the seating occupant P to an inside in the vehicle width direction.

In this embodiment, each of the outer airbag 18 and the inner airbag 22 is constructed by including a chest protection chamber and a head protection chamber that are inflated and deployed on sides of at least the chest and the head of the seating occupant P.

In the following descriptions, the outer airbag device 14, the inner airbag device 16, and the components thereof are distinctively followed by a reference symbol "D" when those are used in the driver's seat 11D and a reference symbol "P" when used in the passenger seat 11P. For example, the outer airbag device 14 for the driver's seat 11D is represented as the "outer airbag device 14D," and the inner inflator 24 for the passenger seat 11P is represented as the "inner inflator 24P."

The side-impact airbag system 10 includes an ECU 26 as a control means that controls the operation of the outer airbag device 14 and the inner airbag device 16. The ECU 26 is electrically connected to each of the outer inflators 20D and 20P and the inner inflators 24D and 24P. The ECU 26 is also electrically connected to a side-impact sensor 28 that detects a side impact collision of the automobile S. Thus, the ECU 26 can detect whether the side impact collision has occurred or not and on which side the side impact collision has occurred (on the right or the left side) in accordance with an input from the side-impact sensor 28. The side-impact sensor 28 is constructed by including, for example, an acceleration detector that is provided on both of the right and the left sides of the vehicle.

The ECU 26 is configured to control the outer inflators 20D and 20P and the inner inflators 24D and 24P in accordance with the direction of the side impact collision when detecting the side impact collision. The behavior of the seating occupant P in the event of the side impact collision will be described for a precondition of the control. This precondition is made on a premise that the seating occupants P on the vehicle seats 11 are subject to the protection (movement restraint) by the outer airbag devices 14 and the inner airbag devices 16.

In the event of the side impact collision, the occupant on the vehicle seat 11 is first made to move toward a collision side with respect to the vehicle body by inertia. It should be noted here that the distance between the seating occupant P on the vehicle seat 11 on the collision side (near side) and a side door is shorter than that between the occupant of the vehicle seat 11 on an opposite side of the collision (far side) and the adjacent seat (seat back). Therefore, the seating occupant P on the collision side requires the protection within a short time from the detection of the collision and also quick restraint on the movement toward the collision side by the airbag in comparison with the seating occupant P on the opposite side of the collision. Accordingly, the movements of the seating occupants P on the collision side and the opposite side of the collision toward the collision side are restrained by the outer airbags 18 and the inner airbags 22, and then the seating occupant P on the collision side and the seating occupant P on the opposite side of the collision are swung back toward the opposite side of the collision in this order.

Therefore, when detecting the side impact collision under a condition where the occupants are seated on the driver's seat 11D and the passenger seat 11P, the ECU 26 activates the outer inflator 20 on the collision side, the inner inflator 24 on the opposite side of the collision, the inner inflator 24 on the collision side, and the outer inflator 20 on the opposite side of the collision, in this order. More specifically, the ECU 26 instantly activates the outer inflator 20 on the collision side when detecting the side impact collision and then activates the inner inflator 24 on the opposite side of the collision upon a lapse of a delay time T1 from the detection of the side impact collision. Furthermore, the ECU 26 is configured to activate the inner inflator 24 on the collision side upon a lapse of a delay time T2 from the detection of the side impact collision and the outer inflator 20 on the opposite side of the collision upon a lapse of a delay time T3 from the detection of the side impact collision. The relationship is determined to be T1<T2<T3 here.

The delay times T1 through T3 are set in the ranges described below in accordance with a moving deformable barrier (MDB) test at 75 km/h. According to the MDB test, the occupant on the vehicle seat 11 on the opposite side of the collision is preferably restrained by the inner airbag 22 after 60 to 110 [msec.] from the detection of the side impact collision. A first delay time is set from the range of time described above by using an appropriate time according to a vehicle model. Specifically exemplified, when a deployment duration of the inner airbag 22 is assumed to be Tk and the time required for the inflation and the deployment is assumed to be TTF, the delay time T1 can be set as T1=60 to 110 [msec.]−(Tk+TTF). In this embodiment, because Tk≈50 [msec.] and TTF≈10 [msec.], the delay time T1 is set within the range of T1=0 to 50 [msec.] (including the upper and the lower limits) according to the vehicle model.

Similarly, in the MDB test described above, the occupant on the vehicle seat 11 on the collision side is preferably restrained by the inner airbag 22 after 110 to 160 [msec.] from the detection of the side impact collision. Because the deployment duration Tk and the time required for the inflation and the deployment TTF are similar to the above, the delay time T2 can be set as T2=110 to 160 [msec.]−(Tk+TTF)=50 to 100 [msec.].

Furthermore, in the MDB test described above, the occupant on the vehicle seat 11 on the opposite side of the collision is preferably restrained by the outer airbag 18 after 135 to 185 [msec.] from the detection of the side impact collision. Because the deployment duration Tk and the time required for the inflation and the deployment TTF are similar to the above, the delay time T3 can be set as T3=135 to 185 [msec.]−(Tk+TTF)=75 to 125 [msec.].

When the occupant P is seated on the driver's seat 11D and no occupant is seated on the passenger seat 11P, the ECU 26 activates the inflators as follows. In other words, when the side impact collision occurs on the side of the driver's seat 11D, the ECU 26 instantly activates the outer inflator 20D when detecting the side impact collision and then activates the inner inflator 24D upon a lapse of the delay time T2 from the detection of the side impact collision. On the other hand, when the side impact collision occurs on the opposite side of the driver's seat 11D (passenger seat 11P), the ECU 26 activates the inner inflator 24D upon a lapse of the delay time T1 from the detection of the side impact collision and then activates the outer inflator 20D upon a lapse of the delay time T3 from the detection of the side impact collision.

In one viewpoint of this embodiment, at least one of a combination of the inner inflator 24D and the ECU 26 and a combination of the inner inflator 24P and the ECU 26 functions as the gas supply device. In another viewpoint, at least one of a combination of the outer inflator 20D, the inner inflator 24D, and the ECU 26 and a combination of the outer inflator 20P, the inner inflator 24P, and the ECU 26 functions as the gas supply device. In yet another viewpoint, a combination of the inner inflators 24D and 24P and the ECU 26 functions as the gas supply device. In still another viewpoint, a combination of the outer inflators 20D and 20P, the inner inflators 24D and 24P, and the ECU 26 functions as the gas supply device. Furthermore, in this embodiment, the two inner inflators 24D and 24P function as a plurality of the gas supply devices. The timing when an elapsed time from the detection of the side impact collision reaches the delay time T1 serves as a first timing, and the timing when an elapsed time from the detection of the side impact collision reaches the delay time T2 serves as a second timing.

Operations in the first embodiment are described next. On the precondition that the occupant P is seated on the driver's seat 11D, a case where the occupant P is not seated on the passenger seat 11P is described first with reference to a flowchart shown in FIG. 2, and then a case where the occupant P is seated on the passenger seat 11P is described with reference to a flowchart shown in FIG. 3. In FIGS. 4 through 6, white arrows given on the seating occupants indicate the directions in which the occupants P are made to move during collision.

Figure 2:
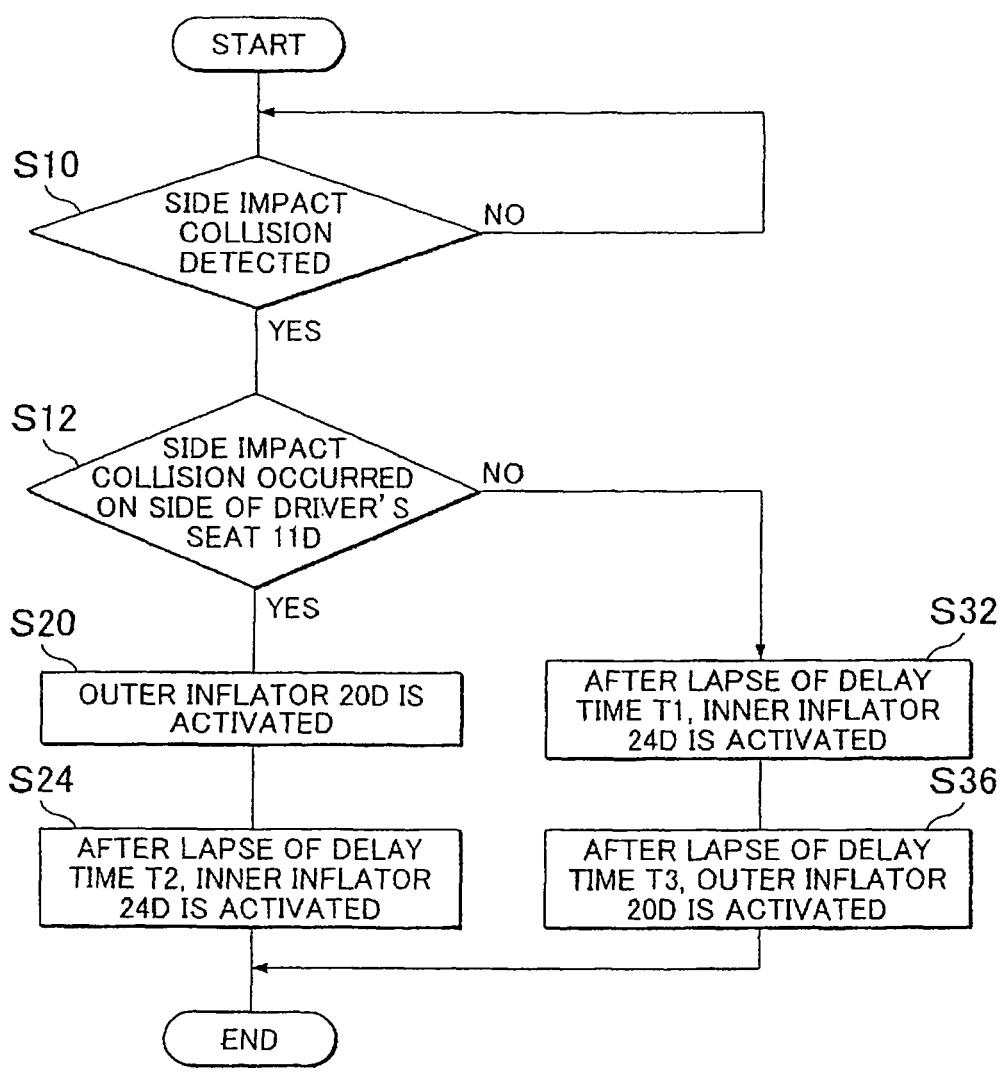
FIG. 2 is a flowchart that shows a control flow in the side-impact airbag system according to the first embodiment in a case where an occupant is not seated on a passenger seat.

In the case where the occupant P is not seated on the passenger seat 11P, the ECU 26 detects an occurrence or a non-occurrence of the side impact collision in accordance with an input from the side-impact sensor 28 in a step S10 as shown in FIG. 2. Until the side impact collision is detected (an affirmative determination is made), the step S10 is repeated. When the affirmative determination is made in the step S10, the process proceeds with a step S12, and a determination whether the direction of the side impact collision is a near side with respect to the driver's seat 11D or not is made. It should be noted that the right side of the vehicle becomes the near side in a case where the driver's seat 11D is positioned on the right side of the vehicle.

Figure 4A:
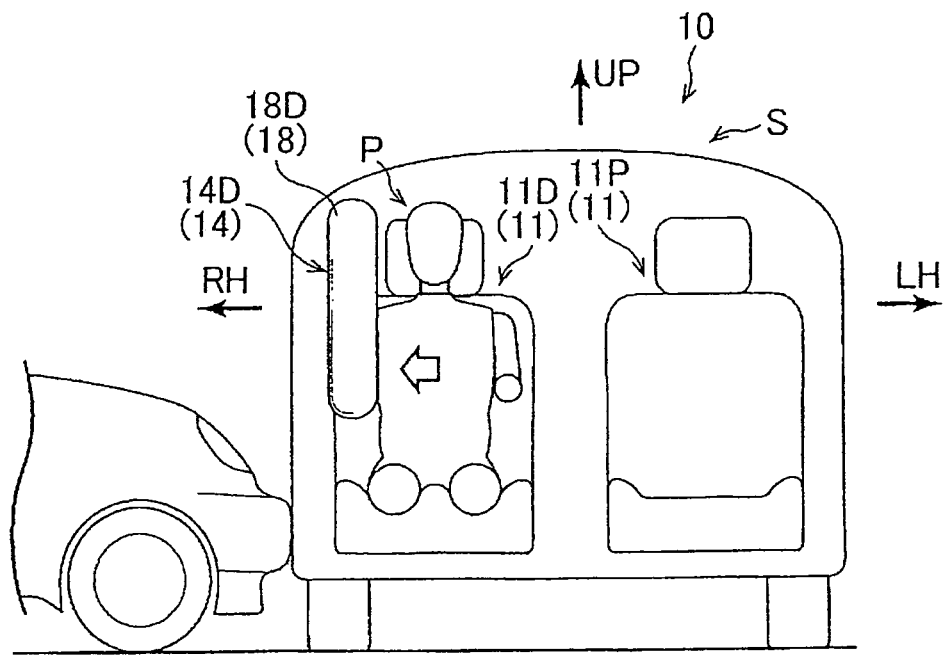
FIG. 4A is a front view that illustrates an operation in the side-impact airbag system according to the first embodiment in the event of a side impact collision on a driver's seat side under a condition where the occupant is not seated on the passenger seat and shows a deployment state of an outer airbag.

In the cases where the side impact collision occurs on the side of the driver's seat and the affirmative determination is made in the step S12, the process proceeds with a step S20. In the step S20, the ECU 26 activates the outer inflator 20D. Then, as shown in FIG. 4A, the outer airbag 18D of the driver's seat 11D is inflated and deployed, and the movement of the seating occupant P toward the outer side in the vehicle width direction (collision side) is restrained. Accordingly, the seating occupant P on the driver's seat 11D is protected from striking against the door due to the movement of the occupant P toward the collision side.

Figure 4B:
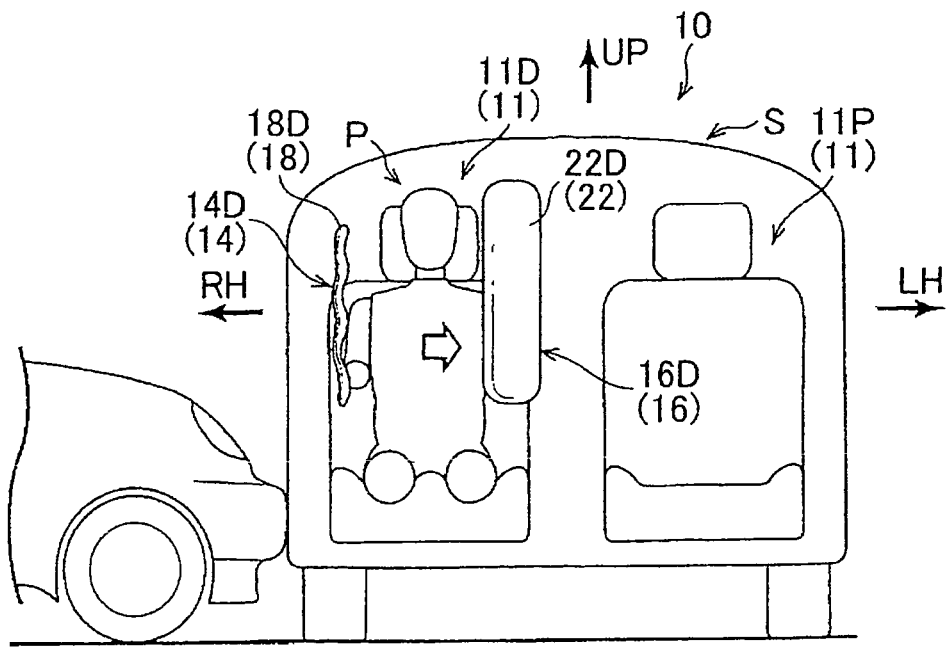
FIG. 4B is a front view that illustrates an operation in the side-impact airbag system according to the first embodiment in the event of the side impact collision on the driver's seat side under a condition where the occupant is not seated on the passenger seat and shows a deployment state of an inner airbag.

The ECU 26 continues to a step S24 after the execution of the step S20. In the step S24, when an elapsed time from the detection of the side impact collision reaches the delay time T2, the ECU 26 activates the inner inflator 24D. Then, as shown in FIG. 4B, the inner airbag 22D of the driver's seat 11D is inflated and deployed, and the movement of the seating occupant P toward the inner side in the vehicle width direction (opposite side of the collision) due to swinging-back is restrained. Accordingly, the seating occupant P on the driver's seat 11D is protected from striking against the passenger seat 11P due to the movement of the occupant P toward the opposite side of the collision. Thus, the ECU 26 finishes the control.

Figure 5A:
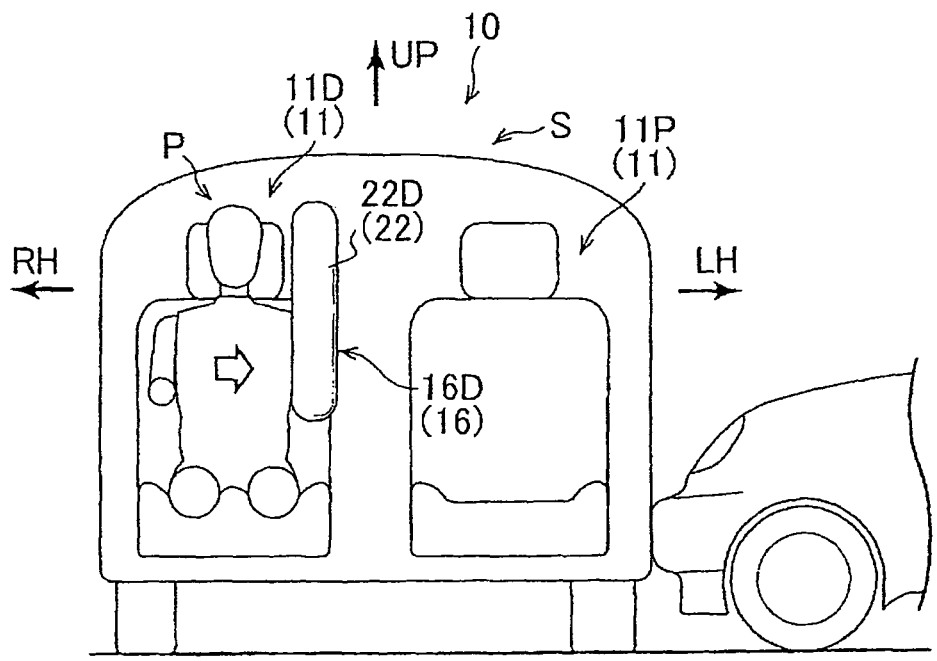
FIG. 5A is a front view that illustrates an operation in the side-impact airbag system according to the first embodiment in the event of the side impact collision on a passenger seat side under a condition where the occupant is not seated on the passenger seat and shows a deployment state of the inner airbag.
Figure 5B:
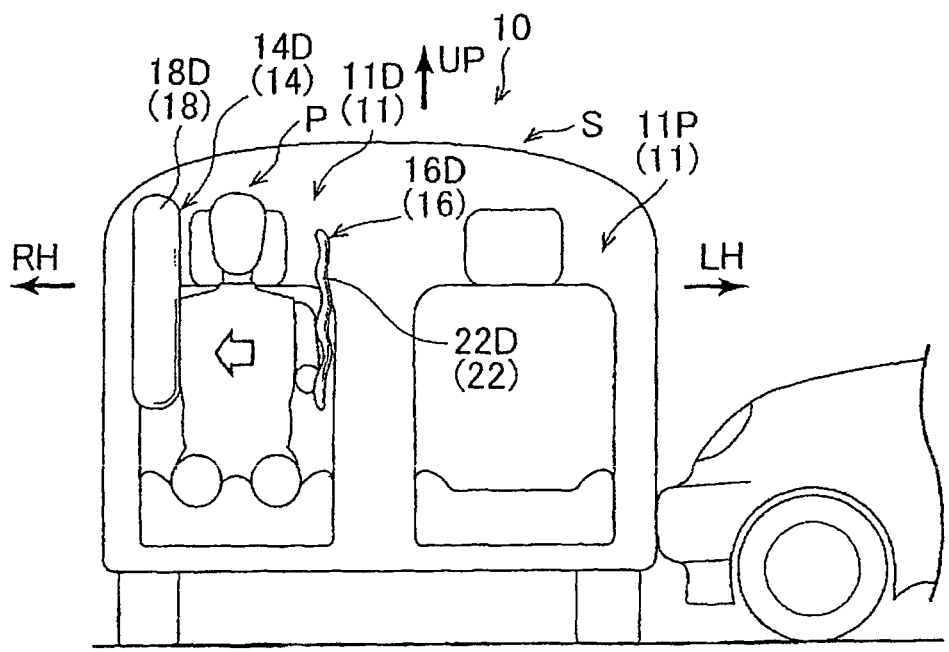
FIG. 5B is a front view that illustrates an operation in the side-impact airbag system according to the first embodiment in the event of the side impact collision on the passenger seat side under a condition where the occupant is not seated on the passenger seat and shows a deployment state of the outer airbag.

On the other hand, in the cases where the side impact collision occurs on the side of the passenger seat and a negative determination is made in the step S12, the ECU 26 continues to a step S32. In the step S32, when an elapsed time from the detection of the side impact collision reaches the delay time T1, the ECU 26 activates the inner inflator 24D. Then, as shown in FIG. 5A, the inner airbag 22D of the driver's seat 11D is inflated and deployed, and the movement of the seating occupant P toward the inner side in the vehicle width direction (collision side) is restrained. Accordingly, the seating occupant P on the driver's seat 11D is protected from striking against the passenger seat 11P due to the movement of the occupant P toward the collision side. The ECU 26 continues to a step S36 after the execution of the step S32. In the step S36, when an elapsed time from the detection of the side impact collision reaches the delay time T3, the ECU 26 activates the outer inflator 20D. Then, as shown in FIG. 5B, the outer airbag 18D of the driver's seat 11D is inflated and deployed, and the movement of the seating occupant P toward the outer side in the vehicle width direction (opposite side of the collision) due to the swinging-back is restrained. Thus, the ECU 26 finishes the control.

As described above, the effective inflation and deployment duration of the outer airbag 18D and the inner airbag 22D is approximately 50 msec. Therefore, in a comparative example in which the outer inflator 20D is activated prior to the inner inflator 24D at the detection of the side impact collision, when the side impact collision occurs on an opposite side of the driver's seat 11D (far side), a restraining force of the movement of the occupant P seated on the driver's seat 11D tends to become small. It should be noted that the restraining force of the movement of the seating occupant P means the extent in which the seating occupant P is restrained.

In the side-impact airbag system 10 according to this embodiment here, when the side impact collision occurs on the opposite side of the driver's seat 11D (passenger seat side), the inner inflator 24D is activated conditionally on a lapse of the delay time T1 that is shorter than the delay time T3 at which the outer inflator 20D is activated. Therefore, the movement of the occupant P seated on the driver's seat 11D toward the collision side can effectively be restrained by the inner airbag 22D that is appropriately inflated and deployed. Through the activation of the outer inflator 20D after a lapse of the delay time T3, the movement of the seating occupant P toward the opposite side of the collision due to the swinging-back can effectively be restrained by the outer airbag 18D that is appropriately inflated and deployed.

In the side-impact airbag system 10 here, the activation timing of the inner inflator 24D varies in the case of the side impact collision on the side of the driver's seat 11D (near side) or the side impact collision on the opposite side of the driver's seat 11D (far side). More specifically, the delay time T1 in the case of the side impact collision on the opposite side of the driver's seat 11D (the side of the passenger seat) is set to be shorter than the delay time T2 in the case of the side impact collision on the side of the driver's seat 11D. Therefore, in the case of the side impact collision on the side of the driver's seat 11D, the movement of the seating occupant P toward the opposite side of the collision due to the swinging-back can effectively be restrained by the inner airbag 22D that is appropriately inflated and deployed. In addition, in the case of the side impact collision on the opposite side of the driver's seat 11D, the movement of the seating occupant P toward the collision side due to the inertia can effectively be restrained by the inner airbag 22D that is appropriately inflated and deployed.

Figure 3:
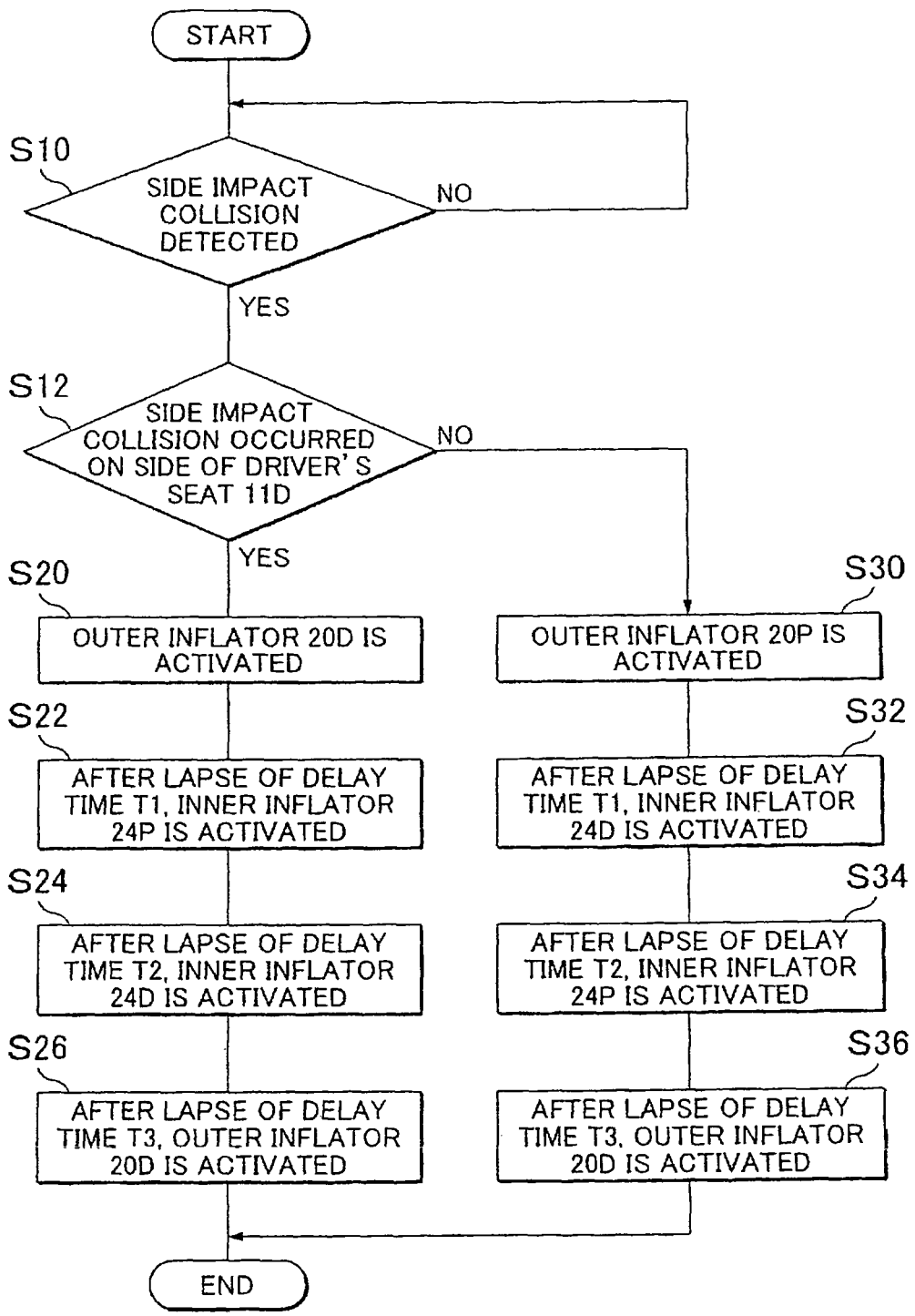
FIG. 3 is a flowchart that shows a control flow in the side-impact airbag system according to the first embodiment in a case where an occupant is seated on a passenger seat.

When the occupant is seated on the passenger seat, the determination in the steps S10 and S12 of the control flow shown in FIG. 3 is the same as the control flow in the case where the occupant is not seated on the passenger seat 11P as described above (FIG. 2).

Figure 6A:
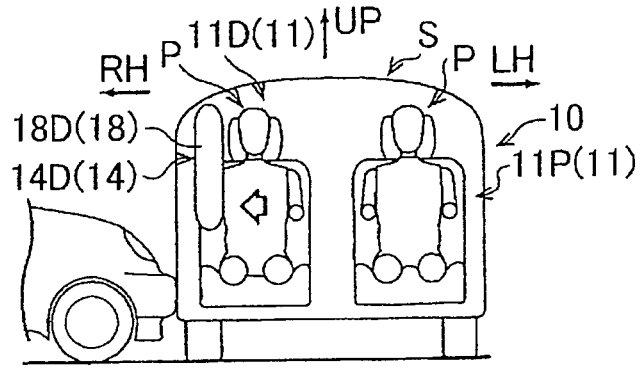
FIG. 6A is a front view that illustrates an operation in the side-impact airbag system according to the first embodiment in the event of the side impact collision on the driver's seat side under a condition where the occupant is seated on the passenger seat and shows a deployment state of the outer airbag of the driver's seat.

A case of the side impact collision on the driver's seat side will be described below as an example. When the affirmative determination is made in the step S12, the process proceeds with the step S20, and the outer inflator 20D is activated. Then, as shown in FIG. 6A, the outer airbag 18D of the driver's seat 11D is inflated and deployed, and the movement of the seating occupant P on the driver's seat 11D toward the outer side in the vehicle width direction (collision side) is restrained. Accordingly, the seating occupant P on the driver's seat 11D is protected from striking against the door due to the movement of the seating occupant P on the driver's seat 11D toward the collision side.

Figure 6B:
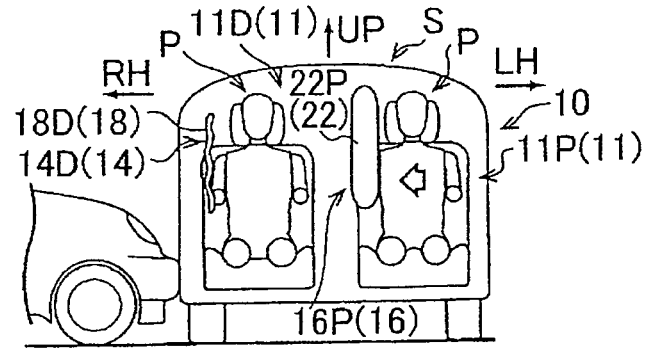
FIG. 6B is a front view that illustrates an operation in the side-impact airbag system according to the first embodiment in the event of the side impact collision on the driver's seat side under a condition where the occupant is seated on the passenger seat and shows a deployment state of the inner airbag of the passenger seat.

The ECU 26 continues to a step S22 after the execution of the step S20. In the step S22, when an elapsed time from the detection of the side impact collision reaches the delay time T1, the ECU 26 activates the inner inflator 24P. Then, as shown in FIG. 6B, the inner airbag 22P of the passenger seat 11P is inflated and deployed, and the movement of the seating occupant P on the passenger seat 11P toward the inner side in the vehicle width direction (collision side) is restrained. Accordingly, the seating occupant P on the passenger seat 11P is protected from striking against the driver's seat 11D due to the movement of the seating occupant P on the passenger seat 11P toward the collision side.

Figure 6C:
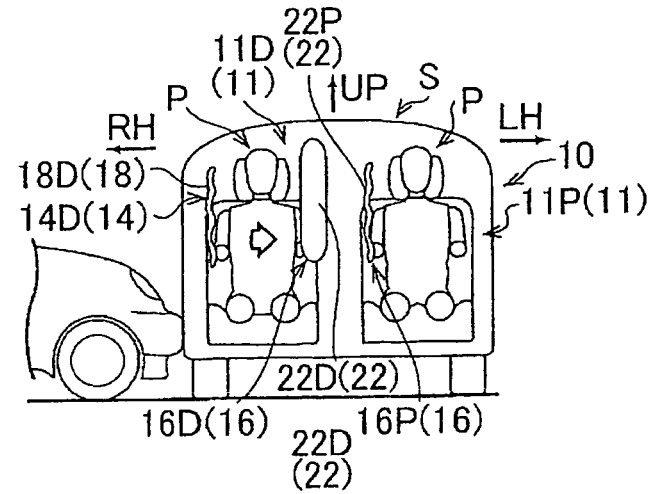
FIG. 6C is a front view that illustrates an operation in the side-impact airbag system according to the first embodiment in the event of the side impact collision on the driver's seat side under a condition where the occupant is seated on the passenger seat and shows a deployment state of the inner airbag of the driver's seat.

Furthermore, the ECU 26 continues to a step S24 after the execution of the step S22. In the step S24, when an elapsed time from the detection of the side impact collision reaches the delay time T2, the ECU 26 activates the inner inflator 24D. Then, as shown in FIG. 6C, the inner airbag 22D of the driver's seat 11D is inflated and deployed, and the movement of the seating occupant P on the driver's seat 11D toward the inner side in the vehicle width direction (opposite side of the collision) due to the swinging-back is restrained. Accordingly, the occupants are protected from striking against each other due to the movement of the seating occupant P on the driver's seat 11D toward the opposite side of the collision.

Figure 6D:
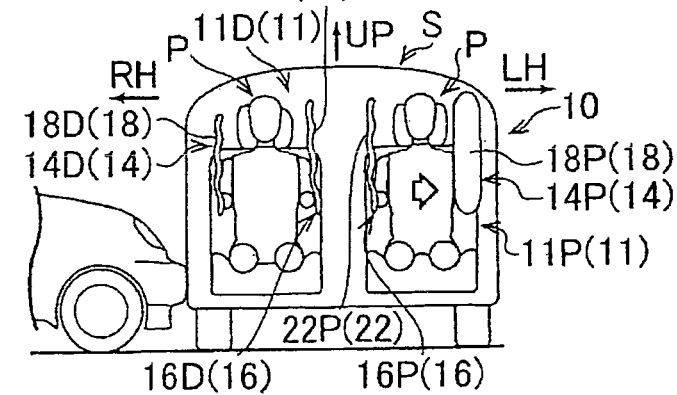
FIG. 6D is a front view that illustrates an operation in the side-impact airbag system according to the first embodiment in the event of the side impact collision on the driver's seat side under a condition where the occupant is seated on the passenger seat and shows a deployment state of the outer airbag of the passenger seat.

Furthermore, the ECU 26 continues to a step S26 after the execution of the step S24. In the step S26, when an elapsed time from the detection of the side impact collision reaches the delay time T3, the ECU 26 activates the outer inflator 20P. Then, as shown in FIG. 6D, the outer airbag 18P of the passenger seat 11P is inflated and deployed, and the movement of the seating occupant P on the passenger seat 11P toward the outer side in the vehicle width direction (opposite side of the collision) due to the swinging-back is restrained. Accordingly, the seating occupant P on the passenger seat 11P is protected from striking against the door due to the movement of the seating occupant P on the passenger seat 11P toward the opposite side of the collision. Thus, the ECU 26 finishes the control.

On the other hand, in the cases where the side impact collision occurs on the side of the passenger seat and a negative determination is made in the step S12, the ECU 26 continues to a step S30. It should be noted that the behavior of the occupants in the case where the negative determination is made in the step S12, that is, in the case where the passenger seat side receives the side impact collision is similar to horizontally inverted behavior of that shown in FIGS. 6A through 6D, and therefore the drawings in this case are not shown.

In the step S30, the ECU 26 activates the outer inflator 20P. Then, the outer airbag 18P of the passenger seat 11P is inflated and deployed, and the movement of the seating occupant P on the passenger seat 11P toward the outer side in the vehicle width direction (collision side) is restrained. Accordingly, the seating occupant P on the passenger seat 11P is protected from striking against the door due to the movement of the seating occupant P on the passenger seat 11P toward the collision side.

The ECU 26 continues to a step S32 after the execution of the step S30. In the step S32, when an elapsed time from the detection of the side impact collision reaches the delay time T1, the ECU 26 activates the inner inflator 24D. Then, the inner airbag 22D of the driver's seat 11D is inflated and deployed, and the movement of the seating occupant P on the driver's seat 11D toward the inner side in the vehicle width direction (collision side) is restrained. Accordingly, the seating occupant P on the driver's seat 11D is protected from striking against the passenger seat 11P due to the movement of the seating occupant P on the driver's seat 11D toward the collision side.

Furthermore, the ECU 26 continues to a step S34 after the execution of the step S32. In the step S34, when an elapsed time from the detection of the side impact collision reaches the delay time T2, the ECU 26 activates the inner inflator 24P. Then, the inner airbag 22P of the passenger seat 11P is inflated and deployed, and the movement of the seating occupant P on the passenger seat 11P toward the inner side in the vehicle width direction (opposite side of the collision) due to the swinging-back is restrained. Accordingly, the occupants are protected from striking against each other due to the movement of the seating occupant P on the passenger seat 11P toward the opposite side of the collision.

Furthermore, the ECU 26 continues to a step S36 after the execution of the step S34. In the step S36, when an elapsed time from the detection of the side impact collision reaches the delay time T3, the ECU 26 activates the outer inflator 20D. Then, the outer airbag 18D of the driver's seat 11D is inflated and deployed, and the movement of the seating occupant P on the driver's seat 11D toward the outer side in the vehicle width direction (opposite side of the collision) due to the swinging-back is restrained. Thus, the ECU 26 finishes the control. Accordingly, the seating occupant P on the driver's seat 11D is protected from striking against the door due to the movement of the seating occupant P on the driver's seat 11D toward the opposite side of the collision.

As described above, in the side-impact airbag system 10, the delay times T1 through T3 that are set according to the behavior of the occupants in the event of the side impact collision are set in the ECU 26. The ECU 26 activates the outer inflators 20D and 20P and the inner inflators 24D and 24P at respective activation timings that are no delay time and delay times T1 through T3 in accordance with the directions of the side impact collision. Accordingly, the outer airbags 18D and 18P of the outer airbag devices 14 and the inner airbags 22D and 22P of the inner airbag devices 16 for the driver's seat 11D and the passenger seat 11P are appropriately inflated and deployed in accordance with the directions of the side impact collision. Therefore, in both cases where the occupant is seated on only the driver's seat 11D (in the case of single occupancy vehicle) and where the occupants are seated on the driver's seat 11D and the passenger seat 11P (in the case of plural occupancy vehicle), the occupant P can effectively be protected against the side impact collision.

It should be noted that the descriptions have been made separately in the cases where the occupant is seated on the passenger seat 11P and where the occupant is not seated on the passenger seat 11P; however, the present invention may be configured such that the presence or absence of the occupant on the passenger seat 11P may be detected and the flows shown in FIGS. 2 and 3 may be changed and processed in accordance with the detection result. To detect the presence or absence of the seating occupant P on the passenger seat 11P, an occupant sensor 50 can be used.

A side-impact airbag system 40 according to a second embodiment will be described next with reference to FIGS. 7 through 9. It should be noted that basically the same parts and components as the first embodiment are given with the same reference numerals and symbols, and the descriptions thereof are not repeated.

Figure 7:
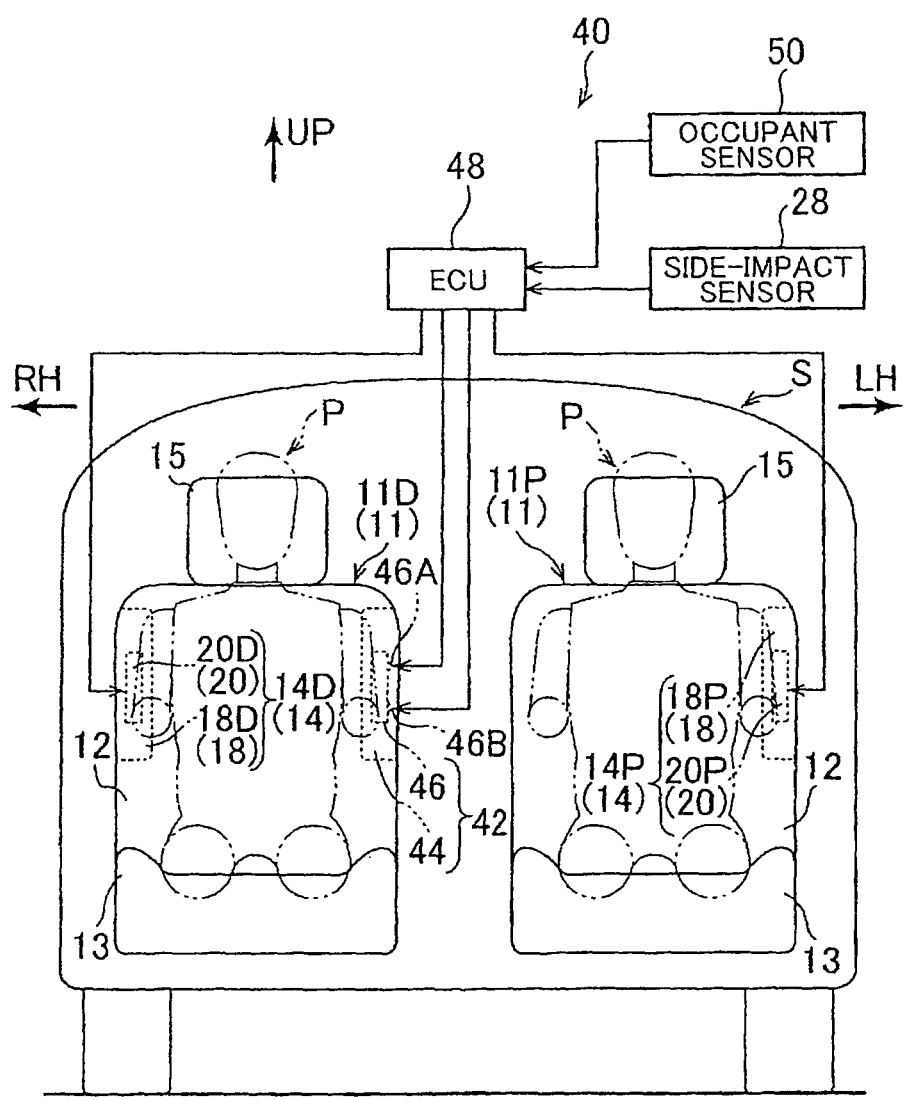
FIG. 7 is a front view that schematically shows an entire schematic structure of the side-impact airbag system according to a second embodiment of the present invention.

FIG. 7 schematically shows the inside of an automobile S to which the side-impact airbag system 40 is applied in a front view corresponding to FIG. 1. As shown in FIG. 7, the side-impact airbag system 40 is different from the side-impact airbag system 10 in including a shared inner airbag device 42 between the driver's seat 11D and the passenger seat 11P instead of the respective inner airbag devices 16 of the driver's seat 11D and the passenger seat 11P. In this embodiment, the inner airbag device 42 is provided in an inner side section of the seat back 12 for the driver's seat 11D in the vehicle width direction.

The inner airbag device 42 includes an inner airbag 44 and an inner inflator 46 as its major components. Components (parts) such as the inner airbag 44 and the inner inflator 46 are modularized and housed in the inner side of the seat back 12 for the driver's seat 11D in the vehicle width direction. The inner airbag 44 is supplied with gas from the inner inflator 46 to inflate and deploy from the seat back 12 toward the front.

In addition, the inner inflator 46 in this embodiment is constructed as a two-stage ignition type dual inflator. More specifically, the inner inflator 46 is constructed with two combustion chambers (not shown) and two squibs 46A and 46B that ignite ignition agents in the two combustion chambers independently (separately). In this embodiment, the inner inflator 46 having the two combustion chambers independently ignited by the squibs 46A and 46B functions as a plurality of the gas supply devices of the present invention.

The activation of the inner inflator 46 is controlled with an ECU 48 as the control means along with the activation of the outer inflators 20D and 20P. In other words, the ECU 48 is electrically connected to each of the outer inflators 20D and 20P and the squibs (combustion chambers) 46A and 46B of the inner inflator 46. The ECU 48 is configured to activate the squib 46A when an activating condition is satisfied and the squib 46B when an additional condition is satisfied thereafter. The volume of a second-stage combustion chamber that is ignited through the activation of the squib 46B is set to be equal to or less than that of a first-stage combustion chamber that is ignited through the activation of the squib 46A.

In addition, the ECU 48 is electrically connected to the side-impact sensor 28 and the occupant sensor 50. The occupant sensor 50 is configured to detect whether the occupant is seated on the passenger seat 11P or not. A number of devices can be used as the occupant sensor 50, including a load sensor that is built into the seat cushion 13 of the passenger seat 11P, a buckle switch that is provided in a buckle of a seat belt device (not shown), an image recognition device that determines the presence or absence of the occupant from a camera image, and an infrared sensor, for example.

In one viewpoint of this embodiment, a combination of the inner inflator 46 and the ECU 48 functions as the gas supply device. In another viewpoint, at least one of a combination of the outer inflator 20D, the inner inflator 46, and the ECU 48 and a combination of the outer inflator 20P, the inner inflator 46, and the ECU 48 functions as the gas supply device. In still another viewpoint, a combination of the outer inflators 20D and 20P, the inner inflator 46, and the ECU 48 functions as the gas supply device. The timing when the elapsed time from the detection of the side impact collision reaches the delay time T1 serves as the first timing, and the timing when the elapsed time from the detection of the side impact collision reaches the delay time T2 serves as the second timing. It should be noted that the activation timing of each inflator (control) by the ECU 48 will be described along with operations in this embodiment.

Figure 8B:
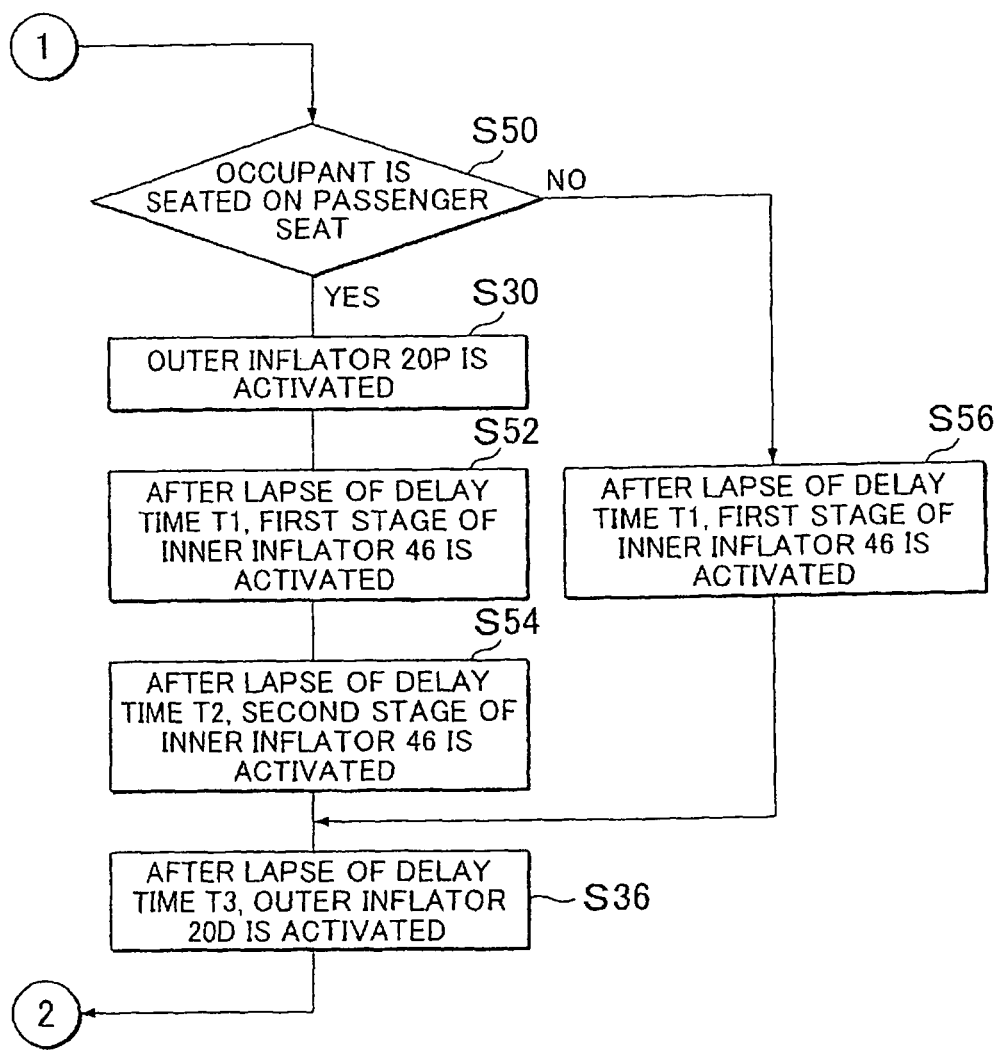
FIG. 8B is a flowchart that shows a control flow in the side-impact airbag system according to the second embodiment.

The operations in the second embodiment are described with reference to a flowchart shown in FIGS. 8A and 8B. It should be noted that the determination in the steps S10 and S12 of this flow is the same as that of the first embodiment.

Figure 9A:
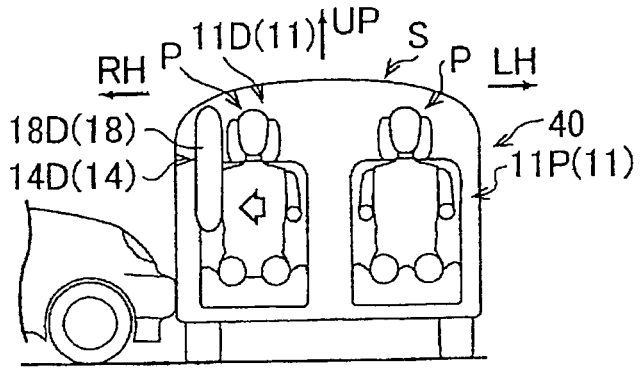
FIG. 9A is a front view that illustrates an operation in the side-impact airbag system according to the second embodiment in the event of the side impact collision on the driver's seat side under a condition where the occupant is seated on the passenger seat and shows a deployment state of the outer airbag of the driver's seat.

In the cases where the side impact collision occurs on the side of the driver's seat and the affirmative determination is made in the step S12, the process proceeds with the step S20, and the outer inflator 20D is activated. Then, as shown in FIG. 9A, the outer airbag 18D of the driver's seat 11D is inflated and deployed, and the movement of the seating occupant P on the driver's seat 11D toward the outer side in the vehicle width direction (collision side) is restrained. Accordingly, the seating occupant P on the driver's seat 11D is protected from striking against the door due to the movement of the seating occupant P on the driver's seat 11D toward the collision side. It should be noted that FIG. 9A shows a state in which the occupant P is seated on the passenger seat 11P; however, in the case where the occupant P is not seated on the passenger seat 11P, the same mode as that shown in FIG. 4A is practiced.

The ECU 48 continues to a step S40 after the execution of the step S20 and determines whether the occupant P is seated on the passenger seat 11P or not based on the information from the occupant sensor 50.

Figure 9B:
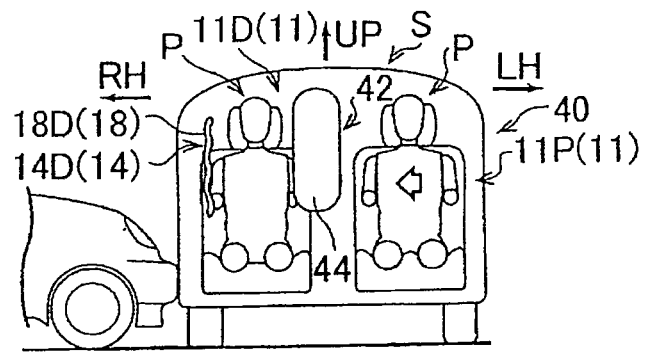
FIG. 9B is a front view that illustrates an operation in the side-impact airbag system according to the second embodiment in the event of the side impact collision on the driver's seat side under a condition where the occupant is seated on the passenger seat and shows a deployment state of the inner airbag of the driver's seat.

In the cases where the occupant is seated on the passenger seat and the affirmative determination is made in the step S40, the process proceeds with the step S42. In the step S42, when the elapsed time from the detection of the side impact collision reaches the delay time T1, the ECU 48 activates the squib 46A of the inner inflator 46. In other words, a first stage of the inner inflator 46 that is the two-stage ignition type inflator is activated. Then, as shown in FIG. 9B, the inner airbag 44 is inflated and deployed between the driver's seat 11D and the passenger seat 11P, and the movement of the seating occupant P on the passenger seat 11P toward the inner side in the vehicle width direction (collision side) is restrained. Accordingly, the seating occupant P on the passenger seat 11P is protected from striking against the driver's seat 11D due to the movement of the seating occupant P on the passenger seat 11P toward the collision side.

Figure 9C:
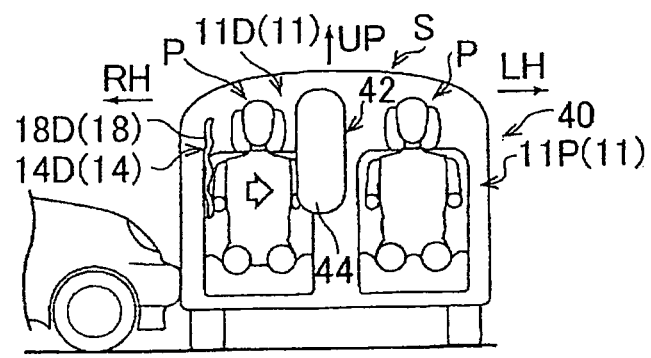
FIG. 9C is a front view that illustrates an operation in the side-impact airbag system according to the second embodiment in the event of the side impact collision on the driver's seat side under a condition where the occupant is seated on the passenger seat and shows a deployment maintaining state of the inner airbag of the driver's seat.

Furthermore, the ECU 48 continues to a step S44 after the execution of the step S42. In the step S44, when the elapsed time from the detection of the side impact collision reaches the delay time T2, the ECU 48 activates the squib 46B of the inner inflator 46. In other words, a second stage of the inner inflator 46 that is the two-stage ignition type inflator is activated. Accordingly, the gas fills the inner airbag 44 of which the internal pressure decreases after a lapse of about 50 msec. from the inflation and the deployment by the first stage of the inner inflator. Therefore, the internal pressure of the inner airbag 44 is restored to the extent equivalent to that during the movement restraint of the seating occupant P on the passenger seat 11P. Then, as shown in FIG. 9C, the inner airbag 44 restrains the movement of the seating occupant P on the driver's seat 11D toward the inner side in the vehicle width direction (opposite side of the collision) due to swinging-back. Accordingly, the occupants are protected from striking against each other due to the movement of the seating occupant P toward the opposite side of the collision.

Figure 9D:
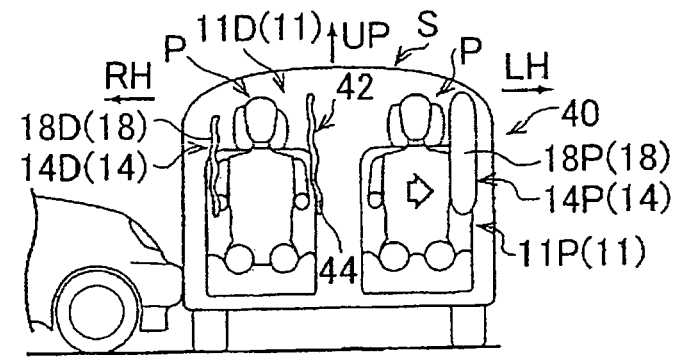
FIG. 9D is a front view that illustrates an operation in the side-impact airbag system according to the second embodiment in the event of the side impact collision on the driver's seat side under a condition where the occupant is seated on the passenger seat and shows a deployment state of the outer airbag of the passenger seat.

Furthermore, the ECU 48. continues to a step S26 after the execution of the step S44. In the step S26, when the elapsed time from the detection of the side impact collision reaches the delay time T3, the ECU 48 activates the outer inflator 20P. Then, as shown in FIG. 9D, the outer airbag 18P of the passenger seat 11P is inflated and deployed, and the movement of the seating occupant P on the passenger seat 11P toward the outer side in the vehicle width direction (opposite side of the collision) due to the swinging-back is restrained. Thus, the ECU 48 finishes the control.

On the other hand, in the cases where the occupant is not seated on the passenger seat and a negative determination is made in the step S40, the ECU 48 continues to a step S46. In the step S46, when the elapsed time from the detection of the side impact collision reaches the delay time T2, the ECU 48 activates the squib 46A of the inner inflator 46. In other words, the first stage of the inner inflator 46 that is the two-stage ignition type inflator is activated. Then, the inner airbag 44 is inflated and deployed between the driver's seat 11D and the passenger seat 11P, and the movement of the seating occupant P on the driver's seat 11D toward the inner side in the vehicle width direction (opposite side of the collision) due to the swinging-back is restrained. Accordingly, the seating occupant P is protected from striking against the passenger seat 11P due to the movement of the occupant P toward the opposite side of the collision.

As described above, in the case where the negative determination is made in the step S40, that is, where the occupant is not seated on the passenger seat 11P, the ECU 48 skips the control corresponding to the steps S42 and S26 and executes the control that contributes to protect the occupant P on the driver's seat 11D only.

In the cases where the side impact collision occurs on the side of the passenger seat and a negative determination is made in the step S12, the ECU 48 continues to a step S50 and determines whether the occupant P is seated on the passenger seat 11P or not based on the information from the occupant sensor 50.

In the cases where the occupant is seated on the passenger seat and the affirmative determination is made in the step S50, the process proceeds with the step S30. It should be noted that the behavior of the occupants on the driver's seat 11D and the passenger seat 11P in the case where the passenger seat side receives the side impact collision is similar to horizontally inverted behavior of that shown in FIGS. 9A through 9D (the inner airbag is positioned on the side of the driver's seat 11D in contrast to inverted drawings), and therefore the drawings in this case are not shown.

In the step S30, the ECU 48 activates the outer inflator 20P. Then, the outer airbag 18P of the passenger seat 11P is inflated and deployed, and the movement of the seating occupant P on the passenger seat 11P toward the outer side in the vehicle width direction (collision side) is restrained.

The ECU 48 continues to a step S52 after the execution of the step S30. In the step S52, when the elapsed time from the detection of the side impact collision reaches the delay time T1, the ECU 48 activates the squib 46A of the inner inflator 46. In other words, the first stage of the inner inflator 46 that is the two-stage ignition type inflator is activated. Then, the inner airbag 44 is inflated and deployed, and the movement of the seating occupant P on the driver's seat 11D toward the inner side in the vehicle width direction (collision side) is restrained.

Furthermore, the ECU 48 continues to a step S54 after the execution of the step S52. In the step S54, when the elapsed time from the detection of the side impact collision reaches the delay time T2, the ECU 48 activates the squib 46B of the inner inflator 46. In other words, the second stage of the inner inflator 46 that is the two-stage ignition type inflator is activated. Accordingly, the gas fills the inner airbag 44 of which the internal pressure decreases after a lapse of about 50 msec. from the inflation and the deployment by the first stage of the inner inflator. Therefore, the internal pressure of the inner airbag 44 is restored to the extent equivalent to that during the movement restraint of the seating occupant P on the passenger seat 11P. Then, the inner airbag 44 restrains the movement of the seating occupant P on the passenger seat 11P toward the inner side in the vehicle width direction (opposite side of the collision) due to the swinging-back.

Furthermore, the ECU 48 continues to a step S36 after the execution of the step S54. In the step S36, when the elapsed time from the detection of the side impact collision reaches the delay time T3, the ECU 48 activates the outer inflator 20D. Then, the outer airbag 18D of the driver's seat 11D is inflated and deployed, and the movement of the seating occupant P on the driver's seat 11D toward the outer side in the vehicle width direction (opposite side of the collision) due to the swinging-back is restrained.

In the cases where the occupant is not seated on the passenger seat and the negative determination is made in the step S50, the ECU 48 continues to a step S56. In the step S56, when the elapsed time from the detection of the side impact collision reaches the delay time T1, the ECU 48 activates the squib 46A of the inner inflator 46. In other words, the first stage of the inner inflator 46 that is the two-stage ignition type inflator is activated. Then, the inner airbag 44 is inflated and deployed between the driver's seat 11D and the passenger seat 11P, and the movement of the seating occupant P on the driver's seat 11D toward the inner side in the vehicle width direction (opposite side of the collision) is restrained. Accordingly, the seating occupant P on the driver's seat 11D is protected from striking against the passenger seat 11P due to the movement of the seating occupant P on the driver's seat 11D toward the opposite side of the collision.

The ECU 48 continues to a step S36 next. In the step S36, when the elapsed time from the detection of the side impact collision reaches the delay time T3, the ECU 48 activates the outer inflator 20D. Then, as shown in FIG. 5B, the outer airbag 18D of the driver's seat 11D is inflated and deployed, and the movement of the seating occupant P on the driver's seat 11D toward the outer side in the vehicle width direction (opposite side of the collision) due to the swinging-back is restrained. Thus, the ECU 48 finishes the control.

As described above, in the case where the negative determination is made in the step S50, that is, where the occupant is not seated on the passenger seat 11P, the ECU 48 skips the control corresponding to the steps S30 and S54 and executes the control that contributes to protect the occupant P on the driver's seat 11D only.

As described above, in the side-impact airbag system 40, the delay times T1 through T3 that are set according to the behavior of the occupants during the side impact collision are set in the ECU 48. The ECU 48 activates the outer inflators 20D and 20P and the inner inflator 46 at respective activation timings that are no delay time and delay times T1 through T3 in accordance with the directions of the side impact collision. Accordingly, the outer airbags 18D and 18P of the outer airbag devices 14 for the driver's seat 11D and the passenger seat 11P and the inner airbag 44 of the inner airbag device 42 are appropriately inflated and deployed in accordance with the directions of the side impact collision. Therefore, in both cases where the occupant is seated on only the driver's seat 11D (in the case of single occupancy vehicle) and where the occupants are seated on the driver's seat 11D and the passenger seat 11P (in the case of plural occupancy vehicle), the occupant P can effectively be protected against the side impact collision.

The side-impact airbag system 40 includes the shared inner airbag device 42 between the driver's seat 11D and the passenger seat 11P. Accordingly, the system structure of the side-impact airbag system 40 is simplified in comparison with that of the side-impact airbag system 10. In addition, the inner inflator 46 is the two-stage ignition type dual inflator. Thus, although the inner airbag device 42 is shared in the side-impact airbag system 40, the side-impact airbag system 40 can protect the occupants on the driver's seat 11D and the passenger seat 11P at appropriate timings in accordance with the similar behavior to the side-impact airbag system 10.

A side-impact airbag system 60 according to a third embodiment will be described next with reference to FIGS. 10 through 12. It should be noted that basically the same parts and components as the first and the second embodiments are given with the same reference numerals and symbols, and the descriptions thereof are not repeated.

Figure 10:
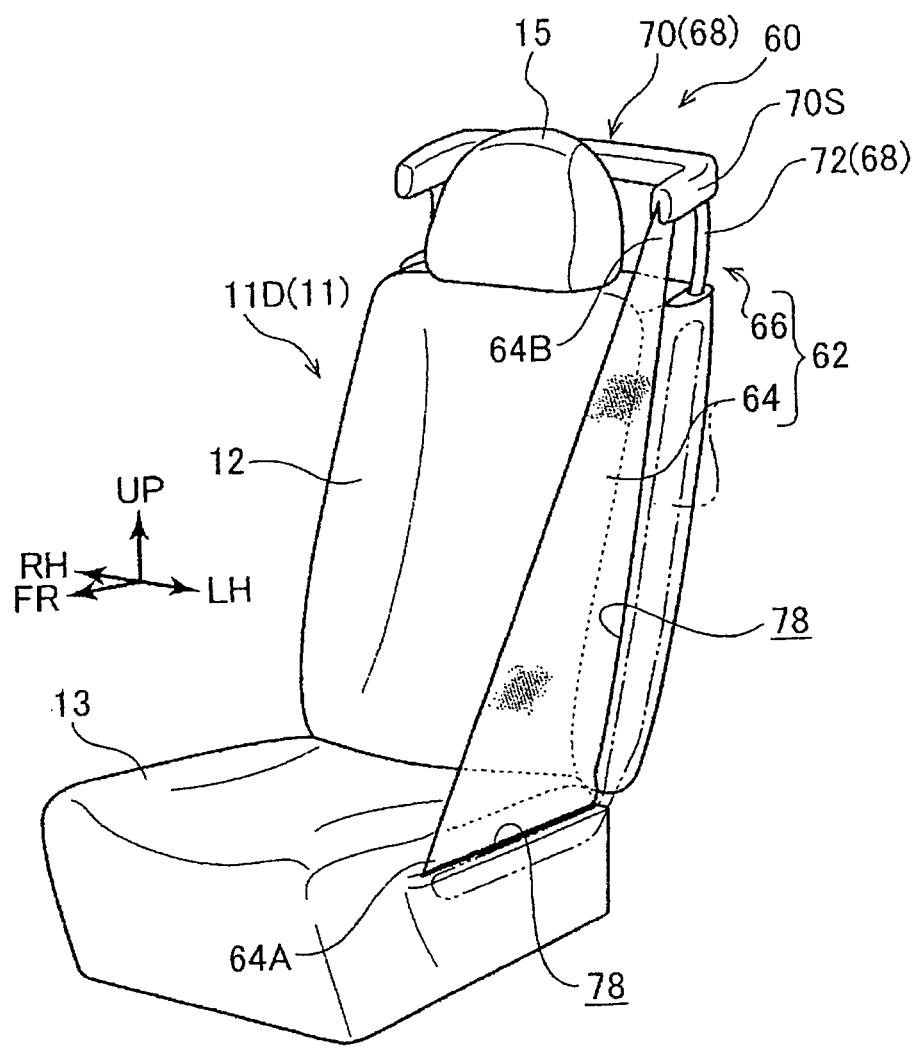
FIG. 10 is a perspective view that shows a deployment state of tension cloth in a vehicle seat to which the side-impact airbag system according to a third embodiment is applied.

FIG. 10 shows a perspective view of a vehicle seat 11 to which the side-impact airbag system 60 is applied. FIGS. 11A and 11B show side views of operating manners of the side-impact airbag system 60 before and after the activation. As shown in the drawings, the side-impact airbag system 60 includes a tension cloth device 62 in addition to the outer airbag device 14 and the inner airbag device 16.

The tension cloth device 62 includes, as its major components, a tension cloth 64 as a lateral deployment member and a pop-up bar structure 66 that functions as a deployment device. Hereinafter, these components will be described specifically.

The pop-up bar structure 66 includes a pop-up bar 68 as a movable body. The pop-up bar 68 can move from a storage position (initial position) as shown in FIG. 11A to a pop-up position (projecting position) as shown in FIG. 10 and FIG. 11B where is an upper position of the storage position with respect to the seat back 12.

The pop-up bar 68 is constructed with a main bar 70 that extends along seat width directions and sliders (rods) 72 as a pair of right and left guided portions hanging from ends of the main bar 70 in the seat width directions. The pop-up bar 68 is supported by a seat back frame 12A (see FIG. 11A) of the seat back 12 in the right and the left sliders 72 through a pair of right and left guide pipes 74 as guiding portions to be movable from the storage position to the pop-up position. In other words, the sliders 72 are constructed to be slidably inserted in the corresponding right and left guide pipes 74, guided along the guide pipes 74, move upward, and thus move from the storage position to the pop-up position. It should be noted that FIG. 11 only shows one side of the right and the left guide pipes.

In this embodiment, the slider 72 and the guide pipe 74 are formed into arc shapes that have approximately the same radius of curvature in their center parts and protrude toward the rear side in a side view. Therefore, the pop-up bar 68 or the main bar 70 is constructed to be displaced upward and forward (movement locus) when it moves from the storage position to the pop-up position. In this embodiment, the main bar 70 is designed to be positioned further to the front when it is in the pop-up position than when it is in the storage position.

In this embodiment, as shown in FIG. 11B, a longitudinal position of the main bar 70 in the pop-up position (a front end of a side bar 70S described below) is determined to be positioned further to the front than a longitudinal position of the upper end of the seat back frame 12A. In addition, a vertical position of the main bar 70 in the pop-up position is determined to be adjacent to an uppermost part of the headrest 15. It should be noted that the vertical position of the main bar 70 in the pop-up position is determined in the range where the main bar 70 does not come into contact with a roof when the vehicle seat 11 is positioned at the frontmost position and the uppermost position.

The main bar 70 constructing the pop-up bar 68 has the side bar 70S that protrudes from the end of the inner side in the vehicle width direction of the main bar 70 to the front. The side bar 70S is constructed to be positioned on the inner side in the vehicle width direction with respect to the headrest 15 in the course of the process in which the main bar 70 moves from the storage position to the pop-up position.

The pop-up bar 68 described above is exposed outside with the main bar 70 including the side bar 70S in the storage position shown in FIG. 11A. In other words, the guide pipe 74 and the slider 72 inserted into the guide pipe 74 are configured to be covered with a cover material (and a cushion material) of the seat back 12 and not to be exposed outside. On the other hand, in the pop-up position shown in FIG. 10 and FIG. 11B, the slider 72 is constructed such that its upper part is exposed outside.

As shown in FIG. 11A, a micro gas generator (hereinafter, referred to as "MGG") 76 is provided in a lower end of the guide pipe 74 in such a way as to block the lower end. The pop-up bar 68 is constructed to move from the storage position to the pop-up position through the activation of the MGG 76. It should be noted that a seal member which seals the gas in may be provided between the slider 72 and the guide pipe 74, and a piston having a sealing function may be provided in the lower end of the slider.

As shown in FIG. 10, the tension cloth 64 is constructed to be disposed on the inner side of the vehicle seat 11 in the vehicle width direction (adjacent seat side) and not to be disposed on the outer side in the vehicle width direction (door side).

Each lower end 64A of the tension cloth 64 is connected to a seat cushion frame (not shown), for example, at a front end side of the seat cushion 13. On the other hand, each upper end 64B of the tension cloth 64 is connected to an end of the main bar 70 of the pop-up bar 68 in seat width direction. More specifically, the upper end 64B of the tension cloth 64 is connected to a front end of the side bar 70S constructing the main bar 70. Furthermore, although not shown in the drawings, each rear edge of the tension cloth 64 is connected to the seat back frame 12A or the guide pipe 74.

Each tension cloth 64 is stored in the sides of the seat cushion 13 and the seat back 12 in a state where the pop-up bar 68 is positioned in the storage position. The tension cloth 64 in this state is folded into a generally "L"-shape along the sides of the seat cushion 13 and the seat back 12 as shown with phantom lines in FIG. 10. Cut lines (slits) 78 in order that the tension cloth 64 spreads out are formed in the sides of the seat cushion 13 and the seat back 12. In this embodiment, the cut lines 78 are formed along front edges of back boards 12B on both of the right and the left sides of the seat back 12 and upper edges of side covers 13A on both of the right and the left sides of the seat cushion 13. It should be noted that the cut lines 78 may be formed on the cover materials and the like on both of the right and the left sides of the seat cushion 13 and the seat back 12.

The tension cloth 64 is drawn from the seat cushion 13 and the seat back 12 through the cut lines 78 with the movement of the pop-up bar 68 from the storage position to the pop-up position and deployed as shown in FIG. 10 and FIG. 11B. In the deployed state, the tension cloth 64 is held under a tension along a straight line (tension line TL) that joins the lower end 64A connected to the seat cushion 13 and the upper end 64B connected to the main bar 70.

Although not shown in the drawings, the ECU configuring the side-impact airbag system 60 is electrically connected to the MGG 76 in addition to the outer inflator 20, the inner inflator 24, and the side-impact sensor 28. The ECU is similarly configured to the ECU 26 except that it activates the MGG 76 prior to the inner inflator 24.

In other words, in the case where the inner inflator 24 is activated after a lapse of the delay time T1 (in the case where the side impact collision occurs on the opposite side of the applied vehicle seat 11 in the vehicle width direction), the MGG 76 is activated immediately after the detection of the side impact collision by the side-impact sensor 28 (with no delay time). On the other hand, in the case where inner inflator 24 is activated after a lapse of the delay time T2 (in the case where the side impact collision occurs on the side of the applied vehicle seat 11 in the vehicle width direction), the MGG 76 is activated after a lapse of a delay time T4. The delay time T4 is set as (T2-Tc) where the time required for the deployment of the tension cloth 64 from the start of the activation of the MGG is Tc (approximately 10 msec.). It should be noted that the side-impact airbag system may be constructed such that a sensor for predicting the side impact collision with a millimeter wave radar and the like is additionally provided, and the MGG 76 is activated before the collision in accordance with the prediction result.

FIG. 12 shows examples of the operating states of the side-impact airbag system 60. More specifically, FIG. 12A shows a state where the inner airbag 22 is inflated and deployed prior to the outer airbag 18 (for example, after the execution of the step S32). FIG. 12B illustrates the deployment state of the outer airbag 18 after the state shown in FIG. 12A (for example, after the execution of the step S36). Furthermore, in FIGS. 10 and 12, illustrations of the seating occupants P are omitted.

Operations of the side-impact airbag system 60 including the tension cloth device 62 having the aforementioned structure differ from the operations of the side-impact airbag system 10 in the following respects. That is, in the control flow shown in FIG. 2 in the case where the occupant is not seated on the passenger seat 11P, the MGG 76 of the driver's seat 11D is activated at the delay time T4 between the step S20 and the step S24. Or, the MGG 76 of the driver's seat 11D is activated with no delay time between the step S12 and the step S32.

Furthermore, in the control flow shown in FIG. 3 in the case where the occupant P is seated on the passenger seat 11P, the MGG 76 of the passenger seat 11P is activated with no delay time between the step S12 and the step S22. Or, the MGG 76 of the passenger seat 11P is activated at the delay time T4 between the step S32 and the step S34.

Accordingly, in the side-impact airbag system 60, as shown in FIG. 10, the tension cloth 64 is deployed prior to the inner airbag 22. Next, as shown in FIG. 12A, the inner airbag 22 is supplied with gas, and while being guided with the tension cloth 64 in the deployed state, inflated and deployed between the tension cloth 64 and the seating occupant P. In addition, the inner airbag 22 restrains the movement of the seating occupant P toward the outer side in the vehicle width direction, while the tension cloth 64 in the deployed state supports the reaction force.

Specifically, the upper end of the tension cloth 64 is connected to the pop-up bar 68 that is positioned in the pop-up position above the seat back 12. Therefore, the tension line TL is positioned further to the front than a tension line TLc (see FIG. 11B) in a comparative example in which the tension of the tension cloth is supported at an upper end of the seat back 12. Thus, guiding performance and reaction force supporting performance of the inner airbag 22 by the tension cloth 64 is higher than that of the comparative example.

It should be noted that the third embodiment has been described with an example in which the tension cloth device 62 is applied to the inner airbag devices 16 of the driver's seat 11D and the passenger seat 11P; however, the present invention is not limited to this. For example, the tension cloth device 62 is applied to the inner airbag device 42 that is provided only in the driver's seat 11D.

In addition, the third embodiment may be constructed such that an upper part of the inner airbag (head protection chamber) 22 is connected to an upper part of the tension cloth 64. In the above structure, the inner airbag 22 before the gas supply is drawn from the seat back 12 with the deployment of the tension cloth 64, and therefore it contributes to the stable deployment behavior of the inner airbag 22 and the reduction of deployment time.

Furthermore, in the third embodiment, the tension cloth device 62 may be applied to the side of the outer airbag device 14.

In the embodiments described above, the examples have been described in which the inner airbags (side airbags) 22 and 44 housed in the seat back 12 are provided as inter-seat airbags; however, the present invention is not limited to this. The inter-seat airbag may be any airbag that is inflated and deployed between the driver's seat 11D and the passenger seat 11P, and for example, an airbag that is housed in a center console and supplied with gas to inflate and deploy upward may be adopted as the inter-seat airbag.

Furthermore, in the embodiments described above, the examples have been described in which the present invention is applied to the driver's seat 11D and the passenger seat 11P; however, the present invention is not limited to this. For example, the present invention may be applied to the rear seat or the vehicle seat in a second row and after.

In addition, the present invention is not limited as for the structure of the vehicle seat on the opposite side in the vehicle width direction in the case where the outer airbag 18 is inflated and deployed prior to the inner airbag 22 against the side impact collision on the opposite side of the applied vehicle seat in the vehicle width direction. That is, in this case, the present invention may be applied to the driver's seat 11D only, or to the passenger seat 11P only. In the structure in which the present invention is applied to only one of the vehicle seats in the vehicle width direction, the control similar to that in the flow shown in FIG. 2 is executed.

On the other hand, in a structure in which a gas supply timing to at least one of the inner airbags 22D and 22P varies in accordance with the direction of the collision, a structure without the outer airbags 18D and 18P may be adopted, and the deployment timing of the outer airbags 18D and 18P may differ from the aforementioned embodiments. Similarly, in a structure in which a gas is supplied to the inner airbag 44 in two stages in accordance with the protection timing of the occupants on the driver's seat and the passenger seat, a structure without the outer airbags 18D and 18P may be adopted, and the deployment timing of the outer airbags 18D and 18P may differ from the aforementioned embodiments.

It should be noted that the embodiments described above has been described with an example in which the outer airbag 18 on the opposite side of the collision is supplied with gas at the delay time T3; however, the present invention is not limited to this. For example, in a case where the speed of the side impact collision (the acceleration detected by the side-impact sensor 28) is low, a structure in which the outer inflator 20 on the opposite side of the collision is not activated may be adopted. In this structure, when a first side impact collision occurs and then a second side impact collision occurs on the opposite side of the first side impact collision in the vehicle width direction (in a case of multiple collisions), the outer inflator 20 on the opposite side of the first side impact collision can be activated in the second side impact collision. That is, the occupants can appropriately be protected in accordance with the direction of the collision and the degree of the collision.

In addition, the present invention can be implemented in various forms without departing from the gist of the present invention.

The occupant protection device may further include an outer airbag that is supplied with gas and inflates and deploys in the outer side in the vehicle width direction for the seating occupant on the seat. The gas supply device may be constructed to supply gas to the inner airbag at the first timing and then supply gas to the outer airbag during the side impact collision of the vehicle in a second direction of the vehicle width direction.

In the occupant protection device described above, when the side impact collision occurs on the vehicle in the second direction of the vehicle width direction in which the vehicle seats are arranged, the gas is supplied to the inner airbag at the first timing prior to the outer airbag. Accordingly, the movement of the seating occupant on the seat toward the collision side is restrained by the inflated and deployed inner airbag. Then, the gas is supplied to the outer airbag. Accordingly, the movement of the occupant is restrained by the inflated and deployed outer airbag, even when the occupant moves toward the opposite side of the collision due to the swinging-back after the restraint of the movement by the inner airbag. As stated above, because the inner and the outer airbags of which the inflation and deployment time is limited are inflated and deployed at appropriate timing, the present invention can appropriately protect the occupants against the side impact collision.

The inner airbag may be shared between the seat and the other seat that is arranged next to the seat in a second direction of the vehicle width direction. The gas supply device may supply gas to the inner airbag at each of the first timing and the second timing in the event of the side impact collision of the vehicle under a condition where occupants are seated on the seat and the other seat.

In the occupant protection device described above, in the event of the side impact collision under the condition where occupants are seated on the seat and the other seat, gas is first supplied to the inner airbag at the first timing. Accordingly, the movement of the occupant on the seat on the opposite side of the collision toward the collision side is restrained by the inner airbag. Furthermore, when specified time elapses and reaches the second timing, the gas is supplied to the inner airbag, and the movement of the occupant on the seat on the collision side toward the opposite side of the collision is restrained by the inner airbag. Accordingly, the occupant on each seat can appropriately be protected by the inner airbag shared between two seats.

The inner airbags may be provided in the seat and the other seat that is arranged next to the seat in the second direction of the vehicle width direction. The gas supply device may supply gas to the inner airbag on the opposite side of the collision at the first timing and then supplies gas to the inner airbag on the collision side at the second timing in the event of the side impact collision of the vehicle under a condition where the occupants are seated on the seat and the other seat.

In the occupant protection device described above, in the event of the side impact collision under the condition where the occupant is seated on each of two seats (the seat and the other seat) that are arranged next to each other in the vehicle width direction, the gas is supplied at the first timing to the inner airbag of the seat on the opposite side of the collision in the inner airbags of the seats. Accordingly, the movement of the occupant on the seat on the opposite side of the collision toward the collision side is restrained at the appropriate timing. Furthermore, when specified time elapses and reaches the second timing, the gas is supplied to the inner airbag on the collision side. Accordingly, the movement of the occupant on the seat on the collision side toward the opposite side of the collision is restrained at the appropriate timing.

The present invention may further include: lateral deployment members that are housed in a seat back and a seat cushion of the seat for deployment in an inner side in the vehicle width direction with respect to the inner airbag; and a deployment device that is activated at timing earlier than the timing for starting a gas supply to the inner airbag in the event of the side impact collision or when the side impact collision is predicted and deploys a lateral deployment member in the inner side in the vehicle width direction for a seating occupant of the seat by moving at least an upper end of the lateral deployment member above an upper end of the seat back.

In the occupant protection device described above, the lateral deployment member deploys on the lateral side of the seating occupant prior to the inflation and the deployment of the inner airbag. Because the lateral deployment member supports a part of a support load (reaction force) of the occupant by the inner airbag, the movement of the occupant toward the lateral side can effectively be restrained.

In a second aspect of the present invention, the occupant protection device includes: an inter-seat airbag that is supplied with gas and inflates and deploys between a pair of seats that are arranged next to each other in a vehicle width direction; and a gas supply device in which a second timing at which gas is supplied to the inter-seat airbag during protection of a seating occupant on a seat on a collision side is set to be later than a first timing at which gas is supplied to the inter-seat airbag during protection of a seating occupant on a seat on an opposite side of the collision in the event of a side impact collision.

In the occupant protection device described above, in the event of the side impact collision of the vehicle, the gas is supplied to the inter-seat airbag, and the inter-seat airbag inflates and deploys. Accordingly, the movement of the occupant on the seat on the opposite side of the collision toward the collision side is restrained. In addition, the movement of the occupant on the seat on the collision side toward the opposite side of the collision due to the swinging-back after the movement toward the collision side is restrained. Incidentally, in the event of the side impact collision, the movement of the occupant on the seat on the opposite side of the collision toward the collision side is made prior to the movement of the occupant on the seat on the collision side toward the opposite side of the collision. In the occupant protection device herein, the second timing at which gas is supplied for protecting the occupant on the seat on the collision side is set to be later than the first timing at which gas is supplied for protecting the occupant on the seat on the opposite side of the collision. Therefore, the inter-seat airbag inflates and deploys at an appropriate timing in accordance with the behavior of the occupant due to the direction of the side impact collision. Accordingly, the airbag of which the inflation and deployment time is limited can appropriately protect the occupants against the side impact collision.

As described above, the occupant protection device according to the second aspect of the present invention can appropriately protect the occupants in accordance with the direction of the side impact collision.

The inter-seat airbag may be shared between the pair of seats, and the gas supply device may include a plurality of gas supply portions that are capable of supplying gas to the inter-seat airbag at various timings.

In the occupant protection device described above, the gas supply device includes a plurality of gas supply portions, and therefore the inter-seat airbag shared between the pair of seats can inflate and deploy at various timings. In other words, the inter-seat airbag shared between the pair of seats can inflate and deploy at an appropriate timing in accordance with the behavior of the occupant due to the direction of the side impact collision.

The gas supply device may activate a first gas supply portion of the plurality of gas supply portions at the first timing and a second gas supply portion of the plurality of gas supply portions at the second timing in a case where an occupant is seated on each of the pair of seats.

In the occupant protection device described above, in the event of the side impact collision under a condition where an occupant is seated on each of the pair of seats, the gas is supplied to the inter-seat airbag from the first gas supply portion of the plurality of gas supply portions at the first timing. Accordingly, the movement of the occupant on the seat on the opposite side of the collision toward the collision side is restrained by the deployed inter-seat airbag. Then, the gas is supplied to the inter-seat airbag from the second gas supply portion of the plurality of gas supply portions at the second timing. Accordingly, the movement of the occupant on the seat on the collision side toward the opposite side of the collision is restrained by the inter-seat airbag in which the internal pressure is maintained or increased.

The inter-seat airbag may be provided in each of the pair of seats, and the gas supply device may include a plurality of gas supply portions that independently supply gas to the inter-seat airbag.

In the occupant protection device described above, the gas is independently supplied to the inter-seat airbag that is provided in each of the pair of seats. Therefore, the inter-seat airbag required for the protection of the occupant can deploy at an appropriate timing in accordance with the direction of the side impact collision and the seating state of the occupant.

The present invention may further include: lateral deployment members that are housed in a seat back and a seat cushion of at least one of the pair of seats; and a deployment device that is activated at timing earlier than the timing for starting a gas supply to the inter-seat airbag in the event of the side impact collision or when the side impact collision is predicted and deploys by tension a lateral deployment member in the inner side in the vehicle width direction with respect to a seating occupant of the seat by moving at least an upper end of the lateral deployment member above an upper end of the seat back.

In the occupant protection device described above, the lateral deployment member deploys on the lateral side of the seating occupant prior to the inflation and the deployment of the inter-seat airbag. Because the lateral deployment member supports a part of a support load (reaction force) of the occupant by the inter-seat airbag, the movement of the occupant toward the lateral side can effectively be restrained.

What is claimed is:

1. An occupant protection device comprising:
  an inner airbag that is supplied with gas and inflates and deploys in an inner side in a vehicle width direction for a seating occupant on a seat that is arranged to offset in a first direction of the vehicle width direction with respect to a central part of a vehicle in the vehicle width direction;
  an outer airbag that is supplied with the gas and inflates and deploys in an outer side in the vehicle width direction for the seating occupant on the seat; and
  a gas supply device that supplies the gas to the inner airbag at a first timing in an event of a side impact collision of the vehicle in a second direction of the vehicle width direction that is an opposite direction of the first direction and supplies the gas to the inner airbag at a second timing that is set to be later than the first timing in the event of a side impact collision of the vehicle in the first direction of the vehicle width direction,
  wherein the first timing is set to be later than a timing to supply gas to the outer airbag in the event of the side impact collision of the vehicle in the first direction of the vehicle width direction.

2. The occupant protection device according to claim 1, wherein the inner airbag is shared between the seat and an other seat that is arranged next to the seat in the second direction of the vehicle width direction, and the gas supply device supplies the gas to the inner airbag at each of the first timing and the second timing in the event of the side impact collision of the vehicle under a condition where occupants are seated on the seat and the other seat.

3. The occupant protection device according to claim 1, wherein two inner airbags are provided, one of the two inner airbags is provided in the seat and an other of the two inner airbags is provided in an other seat that is arranged next to the seat in the second direction of the vehicle width direction, and
  the gas supply device supplies the gas to the inner airbag on an opposite side of the collision at the first timing and then supplies the gas to the inner airbag on a collision side at the second timing in the event of the side impact collision of the vehicle under a condition where occupants are seated on the seat and the other seat.

4. The occupant protection device according to claim 1, further comprising:
  lateral deployment members that are housed in a seat back and a seat cushion of the seat for deployment in an inner side in the vehicle width direction with respect to the inner airbag; and
  a deployment device that is activated at a timing earlier than a timing for starting the gas supply to the inner airbag in the event of the side impact collision or when the side impact collision is predicted and deploys a lateral deployment member in the inner side in the vehicle width direction for the seating occupant of the seat by moving at least an upper end of the lateral deployment member above an upper end of the seat back.

5. The occupant protection device according to claim 1, wherein, when a speed of the side impact collision is low, the outer airbag on an opposite side of the collision is not inflated.

6. The occupant protection device according to claim 1, wherein the gas supply device supplies the gas to the inner airbag at the first timing and then supplies the gas to the outer airbag in the event of the side impact collision of the vehicle in the second direction of the vehicle width direction.

7. The occupant protection device according to claim 6, wherein the seat that is arranged to offset in the first direction of the vehicle width direction with respect to the central part of the vehicle in the vehicle width direction is a driver's seat.

8. An occupant protection device comprising:
   an inter-seat airbag that is supplied with gas and inflates and deploys between a pair of seats that are arranged next to each other in a vehicle width direction;
   a gas supply device in which a second timing at which the gas is supplied to the inter-seat airbag during protection of a seating occupant on one of the pair of seats on a collision side is set to be later than a first timing at which the gas is supplied to the inter-seat airbag during protection of a seating occupant on another one of the pair of seats on an opposite side of the collision in an event of a side impact collision; and
   an outer airbag that is supplied with the gas and inflates and deploys in an outer side in the vehicle width direction for the seating occupant on the one of the pair of seats on the collision side;
   wherein the first timing is set to be later than a timing to supply gas to the outer airbag in the event of the side impact collision of the vehicle.

9. The occupant protection device according to claim 8, wherein two inter-seat airbags are provided, one of the two inter-seat airbags is provided in each of the pair of seats, and
   the gas supply device includes a plurality of gas supply portions that separately supply gas to the inter-seat airbags.

10. The occupant protection device according to claim 8, further comprising:
    a second outer airbag that is supplied with the gas and inflates and deploys in the outer side in the vehicle width direction for the seating occupant on the another one of the pair of seats on the opposite side of the collision,
    wherein two inter-seat airbags are provided, one of the two inter-seat airbags is provided in each of the pair of seats, and
    the gas supply device supplies the gas in the order of the outer airbag, the inter-seat airbag on the opposite side of the collision, the inter-seat airbag on the collision side, and the second outer airbag in the event of the side impact collision.

11. The occupant protection device according to claim 8, further comprising:
    lateral deployment members that are housed in a seat back and a seat cushion of at least one of the pair of seats; and
    a deployment device that is activated at timing earlier than a timing for starting a gas supply to the inter-seat airbag in the event of the side impact collision or when the side impact collision is predicted and deploys by tension a lateral deployment member in the inner side in the vehicle width direction with respect to a seating occupant of the seat by moving at least an upper end of the lateral deployment member above an upper end of the seat back.

12. The occupant protection device according to claim 8, wherein the gas supply device is constructed as a two-stage ignition dual inflator.

13. The occupant protection device according to claim 8, wherein, when a speed of the side impact collision is low, a second outer airbag for the seating occupant on the another one of the pair of seats on the opposite side of the collision is not inflated.

14. The occupant protection device according to claim 8, wherein one of the pair of seats is a driver's seat.

15. The occupant protection device according to claim 8, wherein the inter-seat airbag is shared between the pair of seats, and
    the gas supply device includes a plurality of gas supply portions that are capable of supplying the gas to the inter-seat airbag at various timings.

16. The occupant protection device according to claim 15, wherein the gas supply device activates a first gas supply portion of the plurality of gas supply portions at the first timing and a second gas supply portion of the plurality of gas supply portions at the second timing in a case where an occupant is seated on each of the pair of seats.

* * * * *